(12) United States Patent
Nakamura

(10) Patent No.: US 9,225,933 B2
(45) Date of Patent: Dec. 29, 2015

(54) PLAYBACK DEVICE, TELEVISION RECEIVER, APPARATUS SELECTION METHOD, PROGRAM AND RECORDING MEDIUM

(75) Inventor: Mitsuru Nakamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/359,016

(22) PCT Filed: Aug. 30, 2012

(86) PCT No.: PCT/JP2012/072019
§ 371 (c)(1),
(2), (4) Date: Jun. 3, 2014

(87) PCT Pub. No.: WO2013/073258
PCT Pub. Date: May 23, 2013

(65) Prior Publication Data
US 2014/0267542 A1   Sep. 18, 2014

(30) Foreign Application Priority Data

Nov. 17, 2011   (JP) .................................. 2011-251961

(51) Int. Cl.
*H04N 7/14* (2006.01)
*H04N 21/4143* (2011.01)
(Continued)

(52) U.S. Cl.
CPC ............ *H04N 7/141* (2013.01); *H04L 65/1046* (2013.01); *H04L 65/1059* (2013.01);
(Continued)

(58) Field of Classification Search
CPC ..... H04L 67/22; H04L 67/24; H04L 65/1059; H04L 65/1069; H04L 65/1046; H04N 21/4143; H04N 7/141; H04M 1/7253

USPC ................ 340/540; 345/212; 348/14.01, 553, 348/14.04; 367/99; 370/352, 356, 310; 379/93.17, 142.16, 93.23, 142.04; 455/466, 404.2, 406; 463/25; 709/223; 715/758, 805; 725/12, 32, 62, 110; 726/9; 704/235

See application file for complete search history.

(56) References Cited

U.S. PATENT DOCUMENTS 6,138,096 A * 10/2000 Chan ................... H04L 12/5835
704/200
6,493,020 B1 * 12/2002 Stevenson .............. H04N 7/147
348/14.01

(Continued)

FOREIGN PATENT DOCUMENTS

| CN | 1335970 A | 2/2002 |
|---|---|---|
| CN | 101827143 A | 9/2010 |
| JP | 2003-188987 A | 7/2003 |

OTHER PUBLICATIONS

"Panasonic to Launch VIERA Communication Camera TY-CC10W", Press Release by Panasonic Corporation on Apr. 20, 2010 [online], Internet Website at http://panasonic.co.jp/corp/news/official.data/data.dir/jn100420-1/jn100420-1.html.

*Primary Examiner* — Gerald Gauthier
(74) *Attorney, Agent, or Firm* — Birch, Stewart, Kolasch & Birch, LLP

(57) ABSTRACT

A television (1) including a function of a call using Internet Protocol (IP) includes: a communicating section to transmit and receive a call signal over an IP communication network; an incoming call destination identifying section (11) to identify a user who is designated as an incoming call destination; a judging section to detect a person who is present around the television (1); and a communication control section (13) to transfer the call signal to a mobile phone (4) of the user in a case where a plurality of persons containing the user has been detected. This offers a television capable of a call and ensuring the privacy of the call.

12 Claims, 15 Drawing Sheets

(51) Int. Cl.
*H04L 29/08* (2006.01)
*H04L 29/06* (2006.01)
*H04M 1/725* (2006.01)

(52) U.S. Cl.
CPC ............ *H04L65/1069* (2013.01); *H04L 67/22* (2013.01); *H04L 67/24* (2013.01); *H04M 1/7253* (2013.01); *H04N 21/4143* (2013.01)

(56) References Cited

U.S. PATENT DOCUMENTS

| | | | |
|---|---|---|---|
| 7,054,654 B1 * | 5/2006 | Sladek et al. ................. 455/466 |
| 7,706,356 B1 * | 4/2010 | Olshansky .............. H04L 12/66 |
| | | | 370/351 |
| 7,804,821 B2 * | 9/2010 | Wilhoite et al. .............. 370/356 |
| 8,204,193 B2 * | 6/2012 | Toda ........................ 379/142.16 |
| 8,316,405 B2 * | 11/2012 | Ogasawara .................... 725/110 |
| 8,330,598 B2 * | 12/2012 | Szucs ............................ 340/540 |
| 8,358,645 B2 * | 1/2013 | Xu ........................ H04M 7/006 |
| | | | 370/352 |
| 8,490,128 B2 * | 7/2013 | Davis et al. ..................... 725/32 |
| 8,635,554 B2 * | 1/2014 | Cadiz et al. ................... 715/805 |
| 8,639,214 B1 * | 1/2014 | Fujisaki ................. G06Q 20/32 |
| | | | 379/88.03 |
| 8,644,304 B2 * | 2/2014 | Rahman et al. ................ 370/356 |
| 8,654,943 B2 * | 2/2014 | Pearson .............. H04M 1/2745 |
| | | | 379/142.01 |
| 8,707,189 B2 * | 4/2014 | Liu et al. ......................... 715/758 |
| 8,787,870 B2 * | 7/2014 | Sporel ............... H04L 29/12047 |
| | | | 455/404.2 |
| 8,848,885 B2 * | 9/2014 | Numano .................... 379/93.17 |
| 9,043,845 B2 * | 5/2015 | Davis et al. ..................... 725/62 |
| 2001/0007983 A1 | 7/2001 | Lee |
| 2002/0130972 A1 * | 9/2002 | Simons ......................... 348/553 |
| 2004/0146048 A1 * | 7/2004 | Cotte ............... H04L 29/06027 |
| | | | 370/352 |
| 2006/0004656 A1 | 1/2006 | Lee |
| 2010/0162285 A1 * | 6/2010 | Cohen et al. ..................... 725/12 |
| 2010/0198954 A1 * | 8/2010 | Grasso et al. ................. 709/223 |
| 2010/0199341 A1 * | 8/2010 | Foti et al. ......................... 726/9 |
| 2010/0208634 A1 * | 8/2010 | Eng ........................ H04L 45/00 |
| | | | 370/310 |
| 2011/0038470 A1 * | 2/2011 | Kent .................... H04M 15/06 |
| | | | 379/142.04 |
| 2011/0051716 A1 * | 3/2011 | Shintani et al. ................ 370/352 |
| 2013/0005443 A1 * | 1/2013 | Kosta et al. ..................... 463/25 |
| 2014/0111500 A1 * | 4/2014 | Kasuga ........................... 345/212 |
| 2014/0198619 A1 * | 7/2014 | Lamb et al. ..................... 367/99 |
| 2014/0267542 A1 * | 9/2014 | Nakamura ............. H04L 67/24 |
| | | | 348/14.01 |

* cited by examiner

|  | FACE IMAGE | MAC ADDRESS |
|---|---|---|
| USER A |  | xx:xx:xx:xx:xx:xx |
| USER B |  | yy:yy:yy:yy:yy:yy |
| USER C |  | zz:zz:zz:zz:zz:zz |

FIG. 13

| CATEGORY | MOVIE | NEWS | SPORTS | MUSIC |
|---|---|---|---|---|
| HIGHER-PRIORITY SETTING | TRANSFER TO MOBILE PHONE | RECEPTION ON TV | RECEPTION ON TV | TRANSFER TO MOBILE PHONE |
| OTHER USER DETECTION | ——— | VALID | INVALID | ——— |

PLAYBACK DEVICE, TELEVISION RECEIVER, APPARATUS SELECTION METHOD, PROGRAM AND RECORDING MEDIUM

TECHNICAL FIELD

The present invention relates to a playback device including an IP call function.

BACKGROUND ART

In recent years, a call over an IP communication network has become feasible between televisions having an IP (Internet Protocol) call function (see Non-Patent Literature 1).

For a calling system using a portable terminal such as a mobile phone, there has been developed a system realizing a call over the Internet between the mobile terminal and a predetermined device at the other end (see Patent Literature 1).

CITATION LIST

Patent Literature

Patent Literature 1
Japanese Patent Application, Tokukai, No. 2003-188987 (Publication Date: Jul. 4, 2003)

Non-Patent Literature

Non-Patent Literature 1
"Release of Viera Communication Camera TY-CC10W" [online], Panasonic Corporation, [searched on Jun. 8, 2011], internet <http://panasonic.co.jp/corp/news/official.data/data.dir/jn100420-1/jn100420-1.html>

SUMMARY OF INVENTION

Technical Problem

Unfortunately, in a case where an incoming call arrives at the television and is carried out on that television while a plurality of users are watching the television, it is difficult to personally talk on the television. This causes the problem that it is impossible to ensure privacy of the call. In addition, such a call limits a picture image and a sound of a television broadcast while other users are watching the television. This causes inconvenience to the other users.

The present invention has been made in view of the foregoing problems, and an object of the present invention is to provide a playback device capable of a call with other party and ensuring the privacy of the call.

Solution to Problem

In order to attain the foregoing object, the playback device of the present invention is a playback device (i) including a function of carrying out a call using Internet Protocol (IP) and (ii) being capable of playing back one of a picture image and a sound, the playback device including: communicating means for transmitting and receiving a call signal over an IP communication network; incoming call destination identifying means for identifying a user who is designated as an incoming call destination of the call; person detecting means for detecting a person who is present around the playback device; and transferring means for, in a case where the person detecting means has detected a plurality of persons containing the user, transferring the call signal having been received by the communicating means to another device which is available for the user to carry out the call.

According to the configuration above, in a case where an incoming call arrives at the playback device over the IP communication network, a person(s) around the playback device is detected. In a case where a plurality of persons including a user who is designated as an incoming call destination has been detected, a call signal will be transmitted to another device which is available for the user who is designated as an incoming call destination, to carry out a call. Thus, in a situation where (i) a person other than the user who is designated as an incoming call destination is present around the playback device and (ii) the privacy of the call cannot be ensured, the user can carry out the call on the device to which the call signal has been transferred. As a result, it is possible to prevent the call from being started in a situation where the privacy of the call cannot be ensured.

A television receiver of the present invention is a television receiver including each of the means of the playback device described above.

According to the configuration above, it is possible to achieve, by the television receiver, an effect similar to that achieved by the foregoing playback device.

A method for selecting a device to carry out a call process, according to the present invention, is a method for a playback device (i) including a function of carrying out a call using Internet Protocol (IP) and (ii) being capable of playing back one of a picture image and a sound, to select a device to carry out a call process, the method including the steps of: (a) receiving a call signal over an IP communication network; (b) identifying a user who is designated as an incoming call destination of the call; (c) detecting a person who is present around the playback device; and (d) in a case where a plurality of persons containing the user have been detected in the step (c), transferring the call signal having been received in the step (a) to another device which is available for the user to carry out the call.

According to the configuration above, it is possible to achieve an effect similar to that of the playback device described above.

Note that the scope of the present invention also encompasses a program for operating the playback device and a storage medium in which such a program is stored.

Advantageous Effects of Invention

According to the present invention, a call signal corresponding to an incoming call which has arrived at the playback device can be transferred to another apparatus in accordance with a situation around the playback device. Thus, it is possible to prevent the call from being started by the playback device in an undesired situation and to ensure the privacy of the call.

BRIEF DESCRIPTION OF DRAWINGS

FIG. 13 is a view showing an example of a transfer setting table stored in a storing section, in a playback device in accordance with an embodiment of the present invention.

DESCRIPTION OF EMBODIMENTS

Embodiment 1

Embodiment 1 of the present invention will be described below with reference to FIGS. 1 through 5.

A playback device of Embodiment 1 is a television receiver (hereinafter merely referred to as "television") including a telephone function for a call via an IP (Internet Protocol) communication network. However, the playback device is not limited to a television but can be a personal computer or the like which is capable of an IP call. Note that the "call" as used in Embodiment 1 is not limited to a video call containing a picture image and a sound, but may be a call containing only a sound. Hereinafter, (i) a signal for making an incoming call alert and (ii) a call-associated signal containing at least one of picture data and sound data are collectively referred to as a call signal. That is, the call signal sent at the arrival of an incoming call before the call is started is referred to as (i) the signal for making an incoming call alert. On the other hand, a call signal sent after the call is started is referred to as (ii) the call-associated signal containing at least one of picture data and sound data.

(General Overview of Television)

Figure 2:
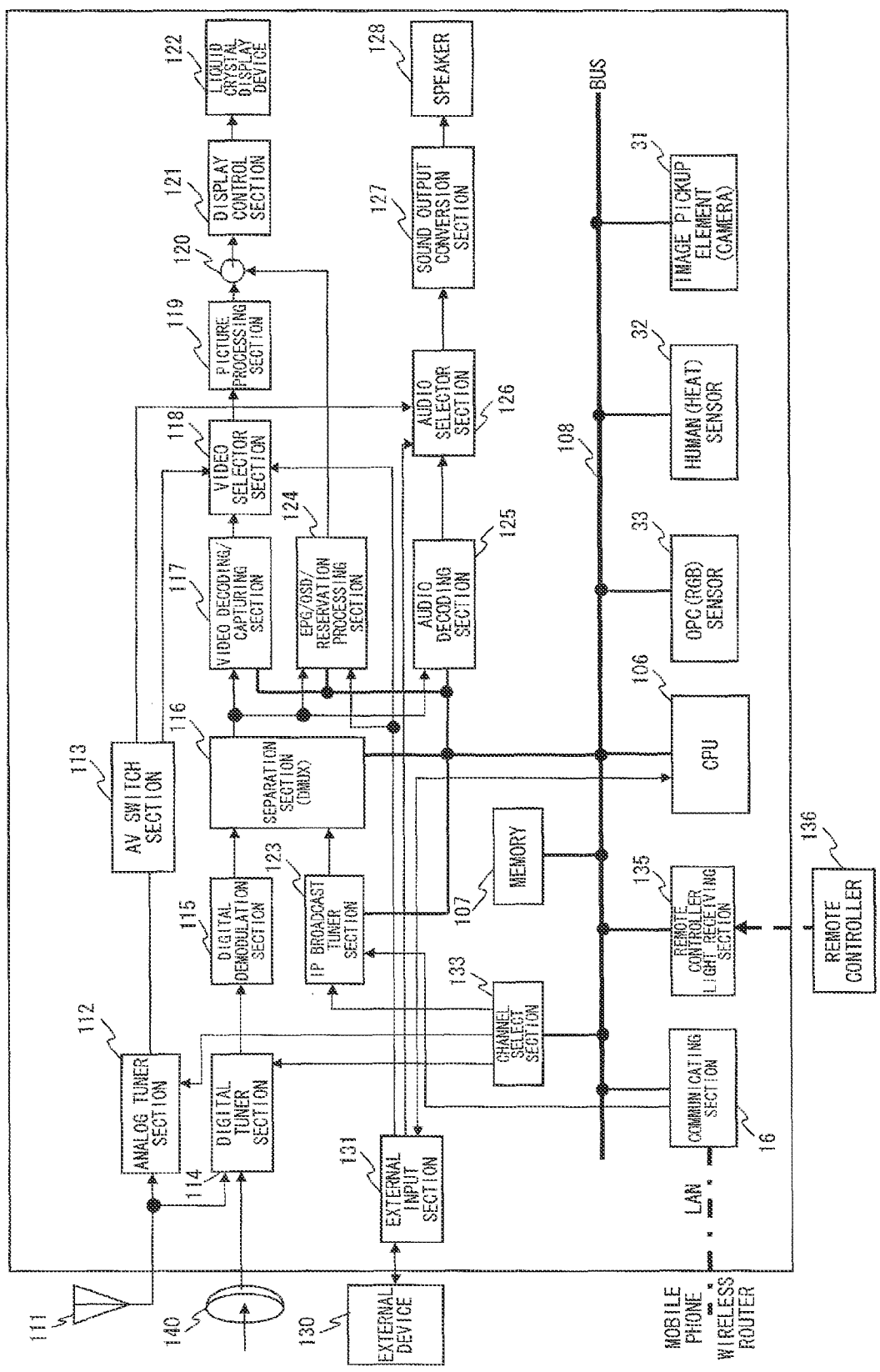
FIG. 2 is a block diagram for illustrating an overall configuration of a playback device in accordance with an embodiment of the present invention.

First, an overview of a configuration of a television of Embodiment 1 will be described with reference to FIG. 2. FIG. 2 is a block diagram schematically illustrating the configuration of a television 1 of Embodiment 1.

The television 1 includes a liquid crystal display device 122 having, for example, a screen size of 16:9 (1920×1010 dots) (see FIG. 2). The television 1 further includes a CPU 106 and a memory 107 both connected to a bus 108. The operation of the television 1 is controlled by the CPU 106 and various control programs stored in the memory 107. That is, the television 1 of Embodiment 1 is controlled by a computer system including the CPU 6, and a program for causing a computer to operate the television 1 is stored in the memory 7.

The television 1 includes a digital tuner section 114 and analog tuner section 112 so as to be able to receive digital broadcasts and analog broadcasts. The television 1 further includes an external input section 131 to which a solid memory such as an HDD and an SD card, a disk device such as a BD (Blue-ray Disk), a DVD, and a CD, and various external devices 130 can be connected. The television 1 further includes an IP broadcast tuner section 123 so as to be able to receive IP broadcasts.

Besides, the television 1 further includes: an AV switch section 113, a digital demodulation section 115, a separation section (DMUX) 116, a video decoding/capturing section 117, a video selector section 118, a picture processing section 119, an adding circuit 120, a display control section 121, an EPG/OSD/reservation processing section 124, an audio decoding section 125, an audio selector section 126, a sound output conversion section 127, a speaker 128, a channel select section 133, a communicating section 16, a remote controller light receiving section 135, and an OPC (RGB) sensor 33 for detecting ambient brightness.

(Main Configuration of Television 1)

Figure 1:
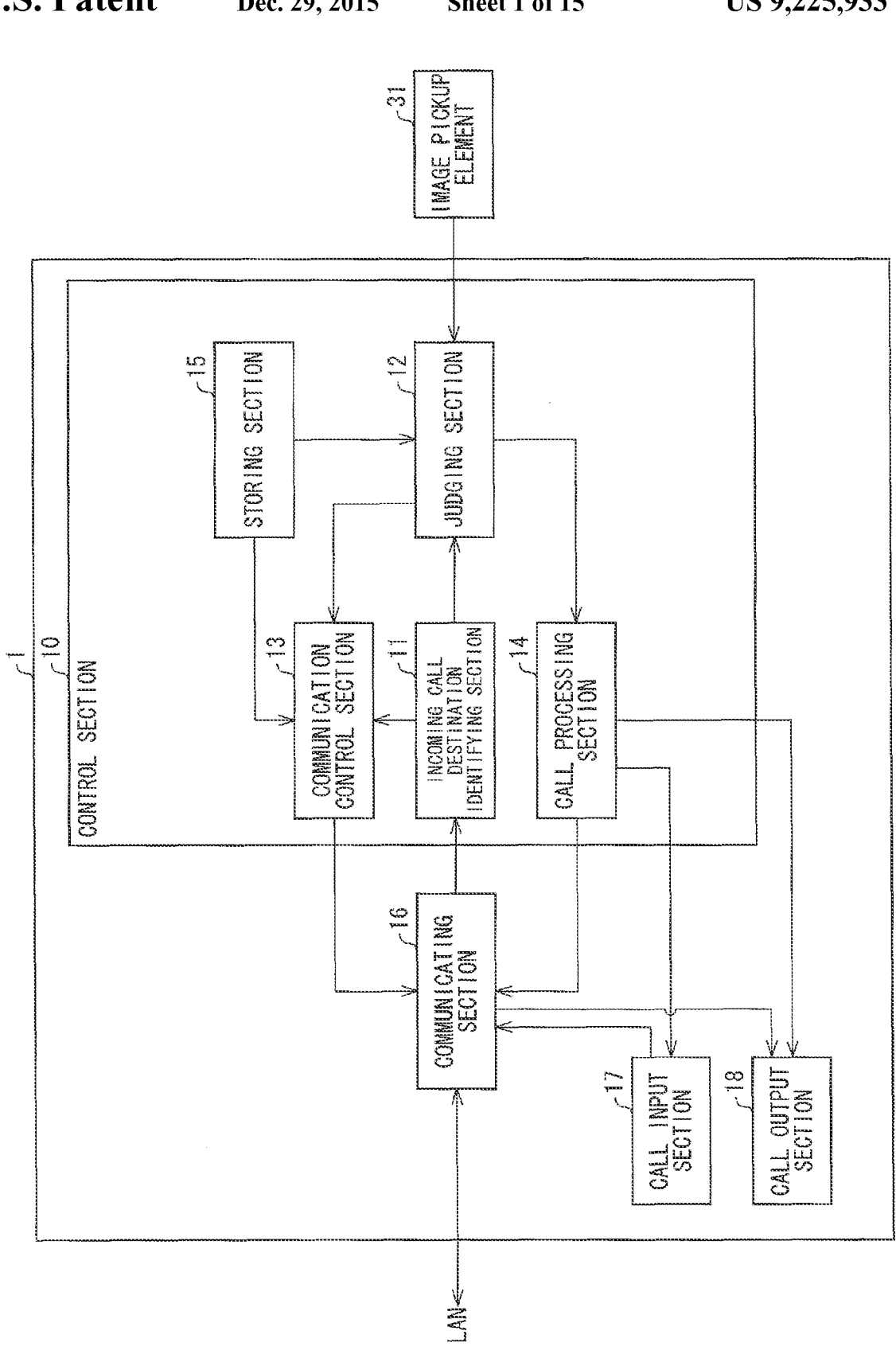
FIG. 1 is a block diagram illustrating a main configuration of a playback device in accordance with an embodiment of the present invention.

Next, a main configuration of the television 1 will be described with reference to FIG. 1. FIG. 1 is a block diagram illustrating the main configuration of the television 1. The television 1 includes a control section 10, a communicating section 16, a call input section 17, and a call output section 18 (see FIG. 1).

The control section 10 selects a device on which a call is carried out, and controls transmission, reception, and transfer of the call signal. The control section 10 includes an incoming call destination identifying section (incoming call destination identifying means) 11, a judging section (person detecting means, extracting means) 12, a communication control section (communicating means, transferring means) 13, a call processing section (communicating means) 14, and a storing section 15.

The incoming call destination identifying section 11 identifies, from a call signal, which user is an intended recipient of an incoming call arriving at the television 1, namely, which user is an intended recipient as a destination of an incoming call. For example, assume that the television 1 has an account set for each user to carry out a call. In this case, it is possible to identify which user is a destination of an incoming call by identifying which account is a destination of the incoming call. Alternatively, a call signal may contain an identification packet from which to identify which user is a destination of an incoming call. In this case, it is possible to identify which user is a destination of the incoming call by referring to such an identification packet.

The judging section 12 (i) obtains image data which is outputted from an image pickup element 31 of a camera, etc. connected to the television 1, and (ii) detects, from the image data thus obtained, a viewer of the television 1 or a person who is present around the television 1. As a method of detecting a person from image data, an image analysis technique such as facial recognition can be employed. Note that the image pickup element 31 may be built in the television 1. The judging section 12 further judges the presence or absence of a user who is designated as a destination of an incoming call, among a person(s) thus detected, by referring to (a) incoming call destination information indicative of a user designated as a destination of an incoming call and (b) a user identification table (user identification information) in which a user and information (feature amount) for identifying the user, such as a face image of the user, are associated with each other. The judging section 12 further judges the presence or absence of a person other than the user who is designated as the incoming call destination, among the person(s) thus detected.

The communication control section 13 establishes a network connection to another device. In accordance with a judgment result of the judgment made by the judging section 12, the communication control section 13 (i) controls the communicating section 16 to transfer the call signal to another device capable of an IP-based call or (ii) controls the call processing section 14 to start a call on the television 1. The term "another device capable of an IP-based call" used herein refers to a mobile terminal, such as a mobile phone and a smart phone, which is owned by a user who is designated as a destination of an incoming call. The following descriptions of Embodiment 1 and descriptions of Embodiments 2 and 3 (later described) assume that the another device capable of an IP-based call is a mobile phone. However, this is not the only possibility. Note that the transfer of a call signal from the communicating section 16 to another device is carried out via a LAN (Local Area Network). Communications between the television 1 and the mobile phone are, for example, wireless communications via a wireless router. A communication standard that supports the wireless communications between the television 1 and the mobile phone is, for example, IEEE 802.11 series ("WiFi"). However, this is not the only possibility. In a case where the television 1 includes communication interface for a wireless LAN, the wireless communications between the television 1 and the mobile phone can be wireless communications without use of the wireless router. For example, Wi-Fi Direct offers a peer-to-peer connection between the television 1 and the mobile phone without requiring an external router.

The call processing section 14 transmits, in accordance with a result of judgment made by the judging section 12, a call signal thus received to the call output section 18 so that the call signal is outputted from the call output section 18 to output devices, such as a liquid crystal display device and a speaker. The call processing section 14 also causes the communicating section 16 to transmit, to a source of the incoming call, another call signal having been received by the call input section 17 and containing call-associated picture data and sound data which are inputted from input devices, such as a camera and a microphone, connected to the television 1.

The storing section 15 stores a program for achieving the user identification table and functions of the control section 10 described earlier.

Note that the control section 10 includes a CPU (Central Processing Unit), ROM (Read Only Memory), RAM (Random Access Memory), and the like. The CPU executes programs stored in the ROM, RAM, and the like so that the functions described above are carried out.

The communicating section 16 communicates with an external device over the IP communication network.

The call input section 17 transmits, to the communicating section 16, the call signal containing the picture data and sound data of the call inputted from input devices, such as a camera and a microphone, connected to the television 1.

The call output section 18 transmits, to the output devices such as a liquid crystal display device and a speaker, the picture data and the sound data which are contained in the call signal having been received by the communicating section 16.

Figure 5:
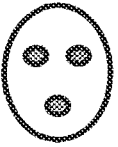
FIG. 5 is a view showing an example of a user identification table stored in a storing section, in a playback device in accordance with an embodiment of the present invention.
Figure 5:
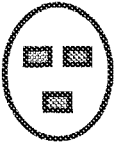
Figure 5:
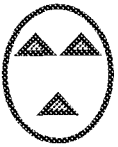

Here, FIG. 5 shows an example of the user identification table. The user identification table is a table in which (i) a user name (specifically, an account name of VoIP call), (ii) a face image of a user used for facial recognition, and (iii) an MAC address (address information) of a mobile phone 4 owned by the user are associated with one another (see FIG. 5). The user identification table is created by using (a) an image of a face of the user, which image is captured by the image pickup element 31 connected to the television 1, (b) a user's account to be registered, and (c) MAC information of the mobile phone 4 owned by the user, wherein (b) the user's account and (c) the MAC information are entered by the user into the television 1. Alternatively, the user identification table can be created by using photograph data of a face of the user, as a subject, which photograph data is stored in the mobile phone 4, and the MAC address, wherein the photograph data and the MAC address are transmitted from the mobile phone 4 to the television 1.

(Flow of Called Device Selection)

Figure 3:
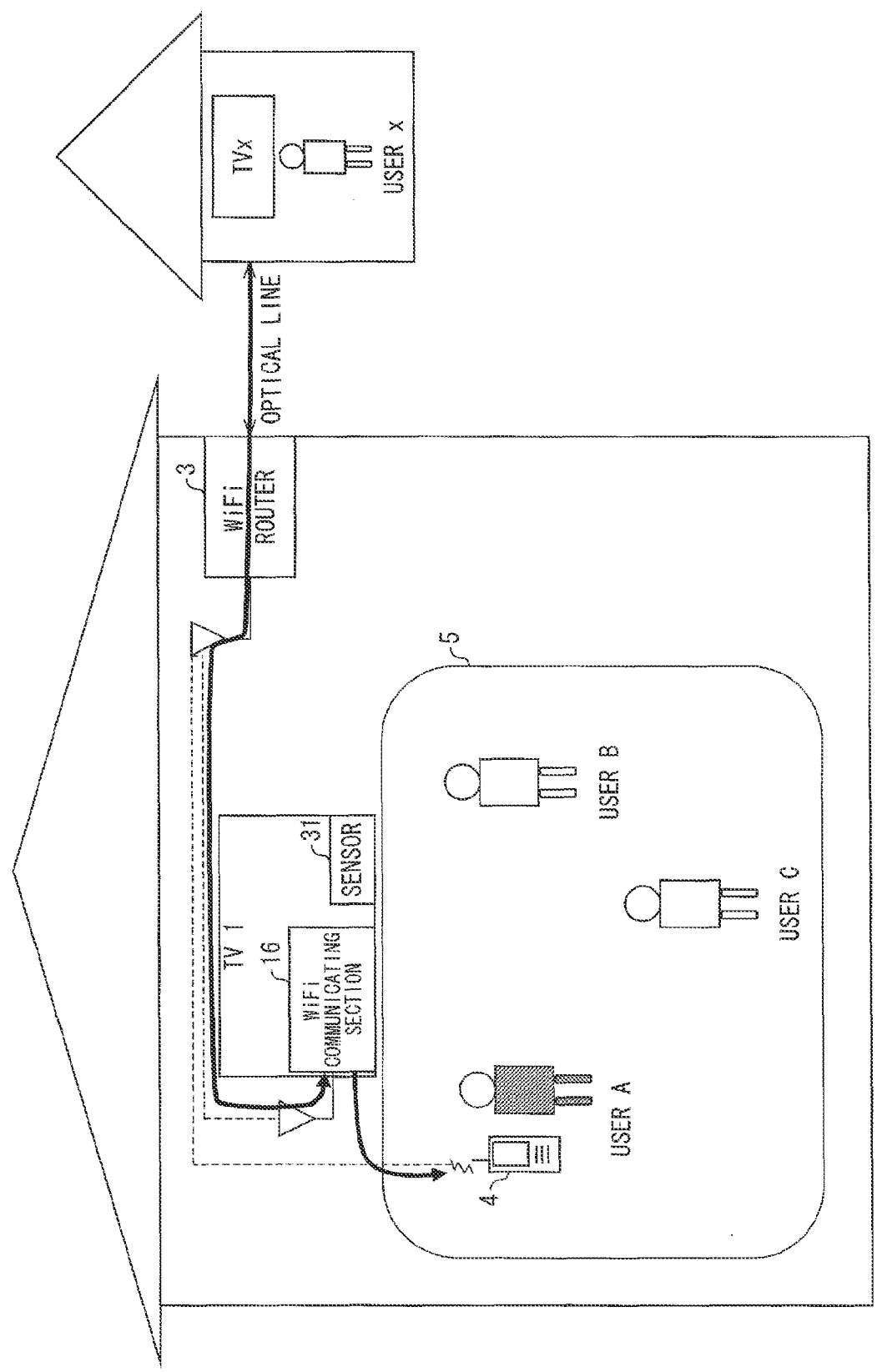
FIG. 3 is a view schematically illustrating a situation in which the present invention is assumed to be carried out in an embodiment of the present invention.

Next, a process to be carried out by the television 1 configured as described above will be described below with reference to FIGS. 3 and 4. The process described below assumes to be carried out, for example, under a circumstance as illustrated in FIG. 3, i.e., under a circumstance where, in a situation where a plurality of persons (users A, B, and C) are watching the television 1, an incoming call for the user A (incoming call destination) arrives over the IP communication network from a user X (a source of the incoming call) who is in a house different from where the user A is. The television 1 carries out WiFi-based communications and is connected to the IP communication network via a WiFi router 3, which is provided in the house where the user A is.

Figure 4:
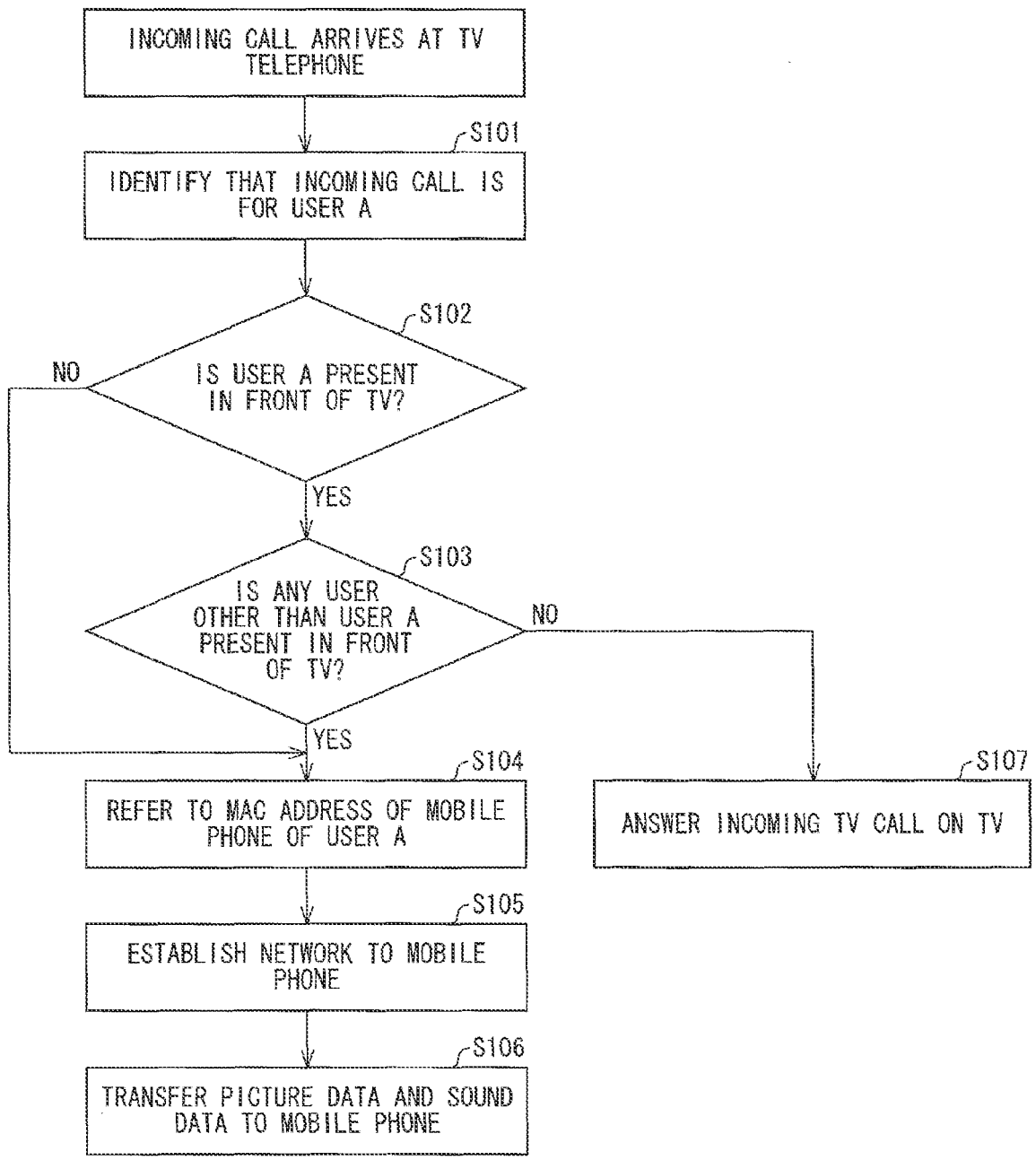
FIG. 4 is a flowchart showing a flow of a process of selecting a called device, in accordance with an embodiment of the present invention.

FIG. 4 is a flowchart showing a called device selection process carried out by the television 1.

A call signal from the user X is received by the communicating section 16 (WiFi communicating section 16 in FIG. 3) of the television 1 by way of the WiFi router 3. The call signal thus received is transmitted to the incoming call destination identifying section 11. The incoming call destination identifying section 11 identifies, from the call signal, which user is a destination of an incoming call corresponding to the call signal (step S101). The incoming call destination identifying section 11 (i) creates incoming call destination information indicating that the incoming call is for the user A and (ii) offers, to the judging section 12, the incoming call destination information thus created.

Upon receipt of the incoming call destination information, from the incoming call destination identifying section 11, indicating that the incoming call is for the user A, the judging section 12 (i) detects persons from a picture image received from the image pickup element 31 and then (ii) refers to the user identification table stored in the storing section 15 to judge the presence or absence of the user A in the persons contained in a detection range 5, which is obtained by the image pickup element 31 (step S102). Specifically, the judging section 12 refers to the incoming call destination information thus received, to identify an account name ("user A" here). Then, the judging section 12 extracts the respective face images of the persons detected from the picture image, which has been transmitted from the image pickup element 31. The judging section 12 further searches the user identification table stored in the storing section 15 for a record containing the account name ("user A" here) thus identified with reference to the incoming call destination information.

Then, the judging section 12 judges whether or not there is a match (agreement) between (i) a face image ("face image" of the "user A" here) being registered in the record thus searched for and (ii) any one of face images thus extracted. In a case where judges that there is no match between (i) the face image of the "user A" being registered in the record and (ii) any one of the face images thus extracted, the judging section 12 judges that the user A is not present in the persons thus detected. In contrast, in a case where the judging section 12 judges that (i) there is a match between the face image of the "user A" being registered in the record and (ii) any one of the face images thus extracted, the judging section 12 judges that the user A is present in the persons thus detected.

In a case where the judging section 12 judges that the user A is not present in the persons thus detected (NO in step S102), the judging section 12 notifies the communication control section 13 of such a judgment result. In contrast, in a case where the judging section 12 judges that the user A is present in the persons thus detected (YES in step S102), the judging section 12 further judges whether or not a person other than the user A is present in the persons thus detected (step S103). For example, in a case where the judging section 12 (i) has detected a plurality of persons or (ii) judges that the face images thus extracted contains a face image, which does not match the face image of the "user A" being registered in the record, the judging section 12 can judge that a person other than the user A is present. In a case where the judging section 12 has judged that a person other than the user A is present (YES in step S103), the judging section 12 notifies the communication control section 13 of such a judgment result. Note that the "person other than the user A" used here can be anyone who is not the "user A", but is not limited to a person registered in the user identification table.

Upon receipt of the notification from the judging section 12, the communication control section 13 (i) receives the incoming call destination information from the incoming call destination identifying section 11, (ii) refers to the user identification table to obtain the MAC address of the mobile phone 4 owned by the user A (step S104), and (iii) establishes a connection to the mobile phone 4 (step S105). Then, the communication control section 13 transfers, via the communicating section 16, the call signal to the mobile phone 4 owned by the user A (step S106).

On the other hand, in a case where the judging section 12 has judged that the user A is present but a person other than the user A is not present in the persons thus detected (NO in step S103), the judging section 12 notifies the call processing section 14 of such a judgment result. Upon receipt of the notification from the judging section 12, the call processing section 14 accepts the call signal, on the television 1, to start a call using the television 1 (step S110). The call signal containing the picture data and the sound data is transmitted and received to/from the source of the incoming call via the communicating section 16.

Once the call signal having been transferred from the television 1 is accepted by the mobile phone 4, the communication control section 13 causes the communicating section 16 to transfer, to the mobile phone 4, the call signal deriving from the source of the incoming call and containing the picture data and the sound data, which call signal has been received by the communicating section 16.

With the foregoing processes executed under the circumstance where a television call for the user A arrives at the television 1 in a situation where not only the user A but also other user are present around the television 1, it is possible to transfer, via the LAN, the television call to the mobile phone 4 of the user A. Similarly, even in a situation where the user A is not present around the television 1, it is possible to transfer the television call to the mobile phone 4 of the user A. This makes it possible to prevent a call from being started in the presence of other user and to ensure the privacy of a call. It is also possible to prevent other user from being interrupted by a call started on the television 1 while watching the television 1.

Note that the mobile phone 4 can be a mobile phone including (i) a deciding section for making a decision as to whether or not to receive a call signal transferred from the television 1, in accordance with a user's operation or information recorded in a recording section, which is provided in the mobile phone 4, and (ii) a transmitting section for transmitting, to the television 1, a result of the decision made by the deciding section. In this case, the communicating section 16 and the control section 10 of the television 1 preferably have a function of starting a call on the television 1 in accordance with the decision result transmitted from the mobile phone 4. With such a configuration, for example, in a case where a call signal corresponding to an incoming call that arrived at the television 1 in a situation where a person other than the user A was present around the television 1 has been transferred to the mobile phone 4, the deciding section can make a decision of not receiving the call signal, in response to an operation made by the user on the mobile phone 4, e.g., a press of a reception refusal button provided on the mobile phone 4, and, subsequently, the transmitting section on the mobile phone 4 can transmit, to the television 1, a result of the decision. Upon receipt of a signal corresponding to the result of the decision, the communicating section 16 and the control section 10 allow a start of the call on the television 1. Thus, even in a situation where a person other than the user A is present around the television 1, the user A can carry out the call on the television 1. The television 1 and the mobile phone 4 both of which are configured as above are particularly useful in, for example, carrying out a television call with a plurality of persons. Note that making a decision as to whether to receive a transferred call signal in response to the user's direct operation on the mobile phone 4 is not the only possibility. Alternatively, such a decision may be made in the following manner. That is, information in which a source of the call signal and the decision result as to whether or not to receive the call signal are associated with each other has been recorded in advance in the recording section of the mobile phone 4, so that the deciding section of the mobile phone 4 can refer to the above information and information on the source of the incoming call, which information is contained in the call signal.

Embodiment 2

Embodiment 2 of the present invention will be described below with reference to FIGS. 6 through 9. Note that, for convenience, members that have functions identical to those described in Embodiment 1 are given identical reference numerals, and are not described repeatedly.

According to Embodiment 2, there are provided in a house a plurality of televisions (television 1a and television 2) having a telephone call function for carrying out a video call over the IP communication network. Each of the televisions is connected to each other over a LAN. Note here that the WiFi is employed as a communication method. However, this is not the only possibility.

(Main Configuration of Television 1a)

Figure 6:
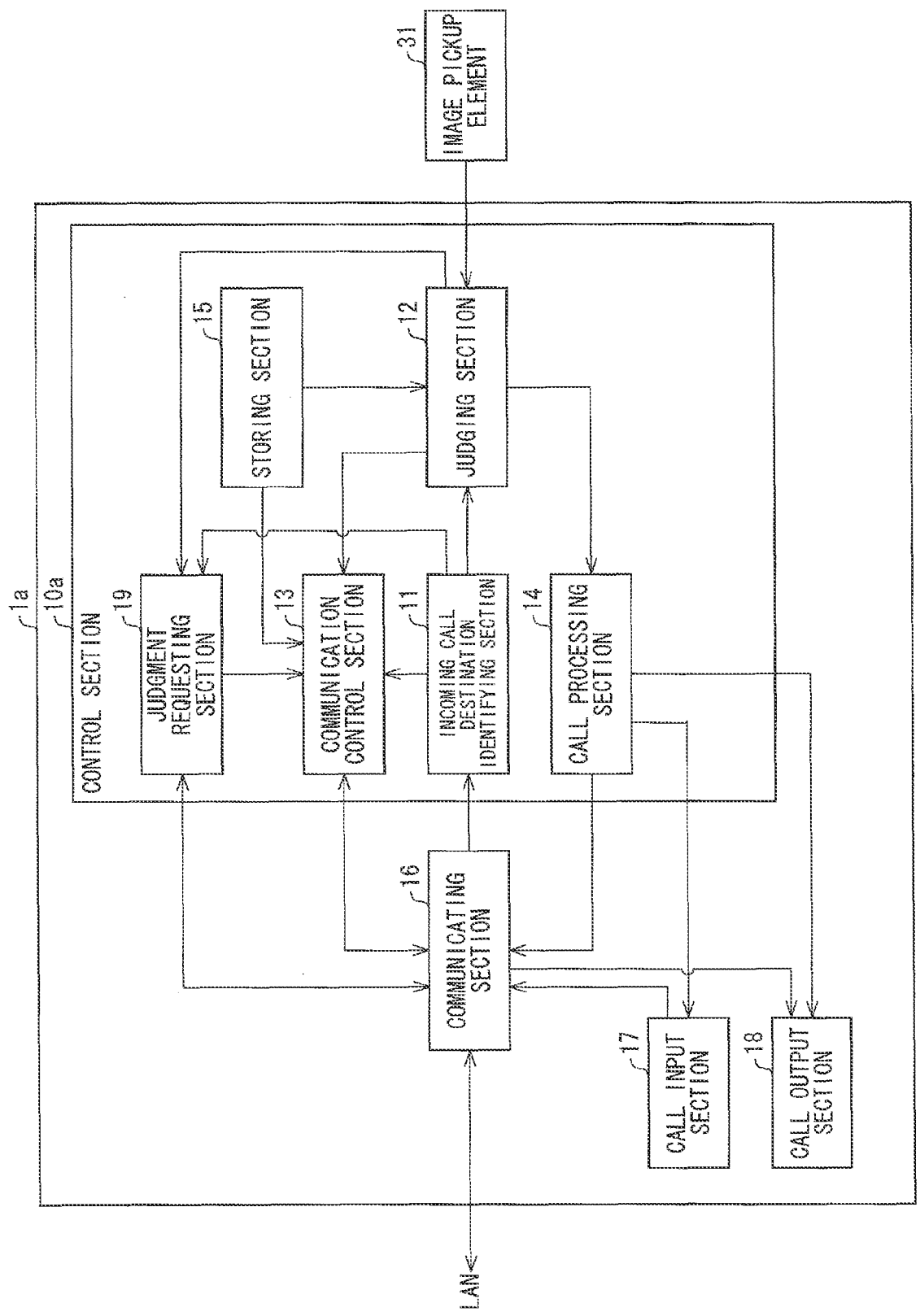
FIG. 6 is a block diagram illustrating a main configuration of the playback device in accordance with an embodiment of the present invention.

A main configuration of a television of Embodiment 2 will be described with reference to FIG. 6. FIG. 6 is a block diagram illustrating a main configuration of the television 1a of Embodiment 2.

The television 1a is different from the television 1 in the point that the control section 10 includes a judgment requesting section (inquiring means) 19 (see FIG. 6).

Depending upon a result of a judgment made by the judging section 12, the judgment requesting section 19 causes the communicating section 16 to transmit, to the television 2, an instruction to cause the television 2 (i) to make a judgment as to the presence or absence of a user who is designated as an incoming call destination around the television 2 and as to the presence or absence of a person other than the user who is designated as the incoming call destination around the television 2 and (ii) to send a result of the judgment back. Further, the judgment requesting section 19 receives, by way of the communicating section 16, the judgment result transmitted from the television 2 and then causes the communication control section 13 to perform a process corresponding to the judgment result.

(Main Configuration of Television 2)

Figure 7:
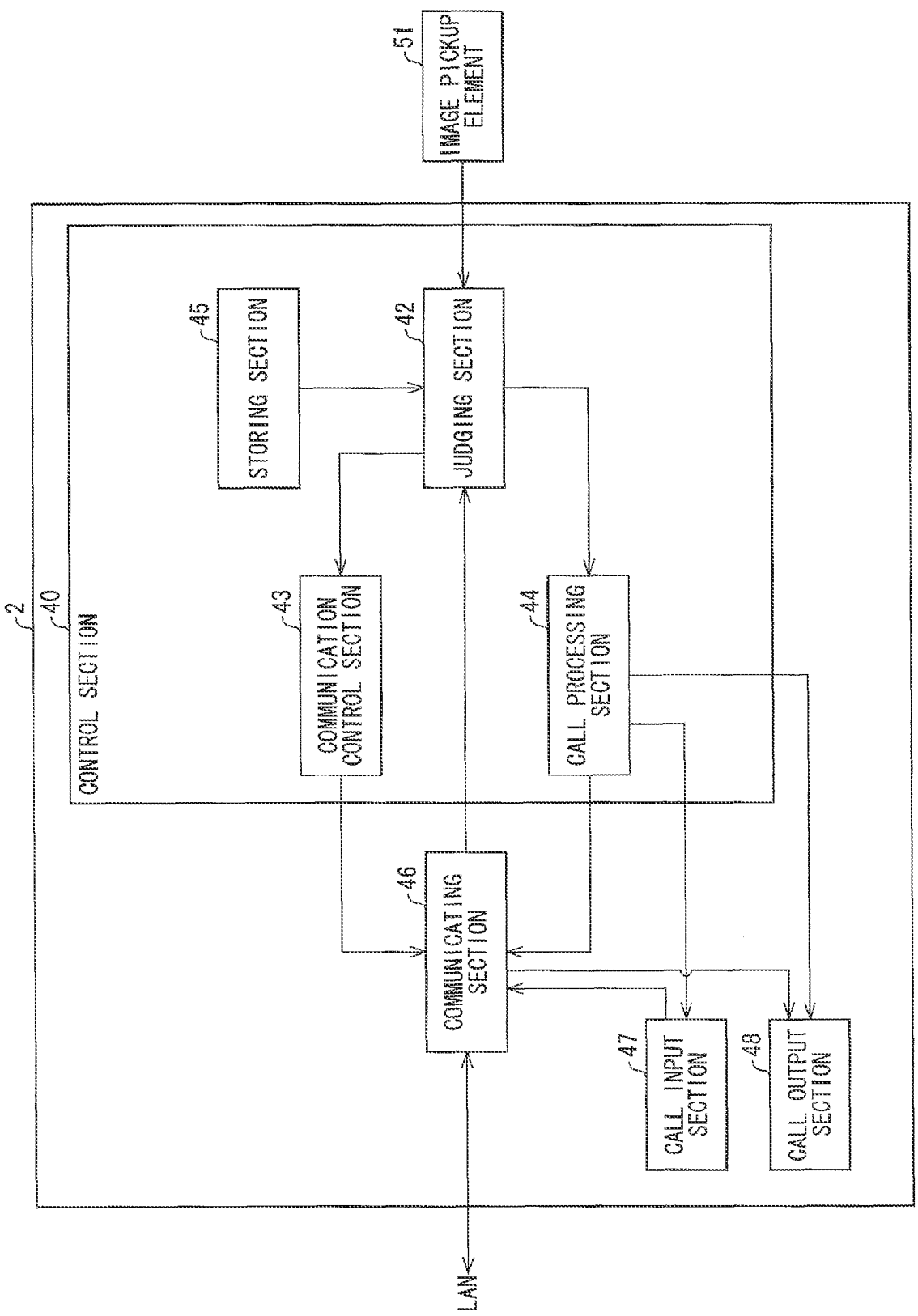
FIG. 7 is a block diagram illustrating a main configuration of another playback device in accordance with an embodiment of the present invention.

FIG. 7 is a block diagram illustrating a main configuration of the television 2. Note that the configuration of the television 2 is basically the same as that of the television 1 illustrated in FIG. 2.

The television 2 includes a control section 40, a communicating section 46, a call input section 47, and a call output section 48. The control section 40 includes a judging section 42, a communication control section 43, a call processing section 44, and a storing section 45.

The judging section 42 (i) obtains image data which is outputted from an image pickup element 51 of a camera etc. connected to the television 2, and (ii) detects, by means of an image analysis technique such as facial recognition, a viewer of the television 2 or a person who is present around the television 2. Note that the image pickup element 51 may be built in the television 2. In a manner similar to that of the judging section 12 of Embodiment 1, the judging section 42 further judges the presence or absence of the user who is designated as the incoming call destination, among a person(s) thus detected, by referring to (a) incoming call destination information, which is transmitted from the television 1a, indicative of a user designated as an incoming call destination and (b) a user identification table stored in the storing section 45. The judging section 42 further judges the presence or absence of a person other than the user who is designated as the incoming call destination in the person(s) thus detected. Note here that the user identification table stored in the storing section 45 is the same as that stored in the storing section 15 of the television 1a. Thus, the user identification table can be transmitted from the television 1a.

The communication control section 43 establishes a network connection to another device. Further, the communication control section 43 controls the communicating section 46 to transmit a result of a judgment made by the judging section 42.

In a case where a call is to be carried out on the television 2, the call processing section 44 transmits a call signal thus received to the call output section 48 so that the call signal is outputted from the call output section 48 to output devices, such as a liquid crystal display device and a speaker. The call processing section 44 also causes the communicating section 46 to transmit, to the television 1a or a source of the incoming call, another call signal having been received by the call input section 47 and containing call-associated picture data and sound data which are inputted from input devices, such as a camera and a microphone, connected to the television 2.

Note that the control section 40 includes a CPU, ROM, RAM, and the like. The CPU executes programs stored in the ROM, RAM, and the like so that the functions described above are carried out.

The communicating section 46 communicates with an external device over the IP communication network.

The call input section 47 transmits, to the communicating section 46, the call signal containing call-associated picture data and sound data which are inputted from the input devices, such as a camera and a microphone, connected to the television 2.

The call output section 48 transmits, to the output devices such as a liquid crystal display device and a speaker, the picture data and the sound data which are contained in the call signal having been received by the communicating section 46.

(Flow of Called Device Selection)

Figure 8:
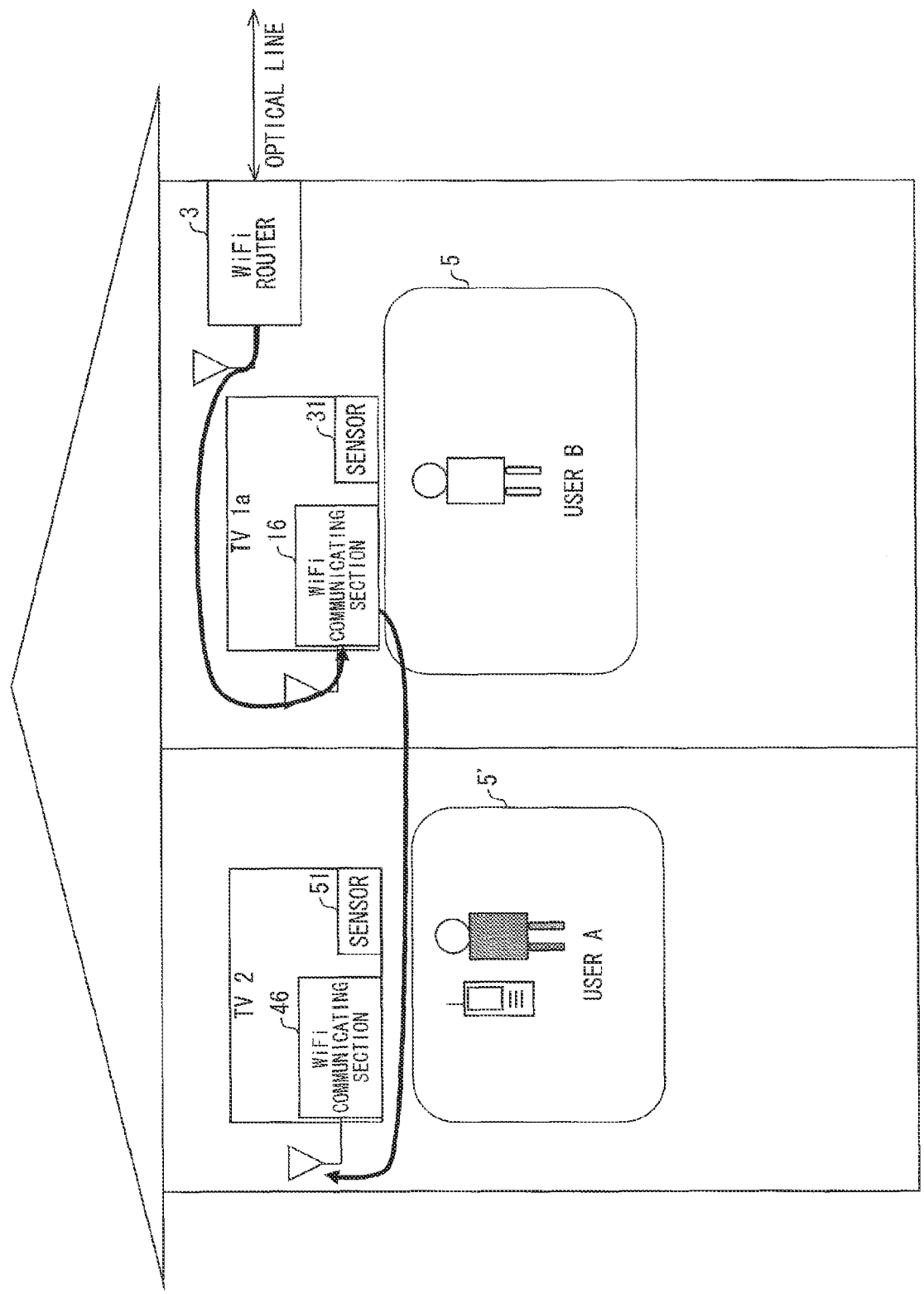
FIG. 8 is a view schematically illustrating a situation in which the present invention is assumed to be carried out in an embodiment of the present invention.

Next, a process to be carried out by the televisions 1a and 2 configured as above will be described below with reference to FIGS. 8 and 9.

Figure 9:
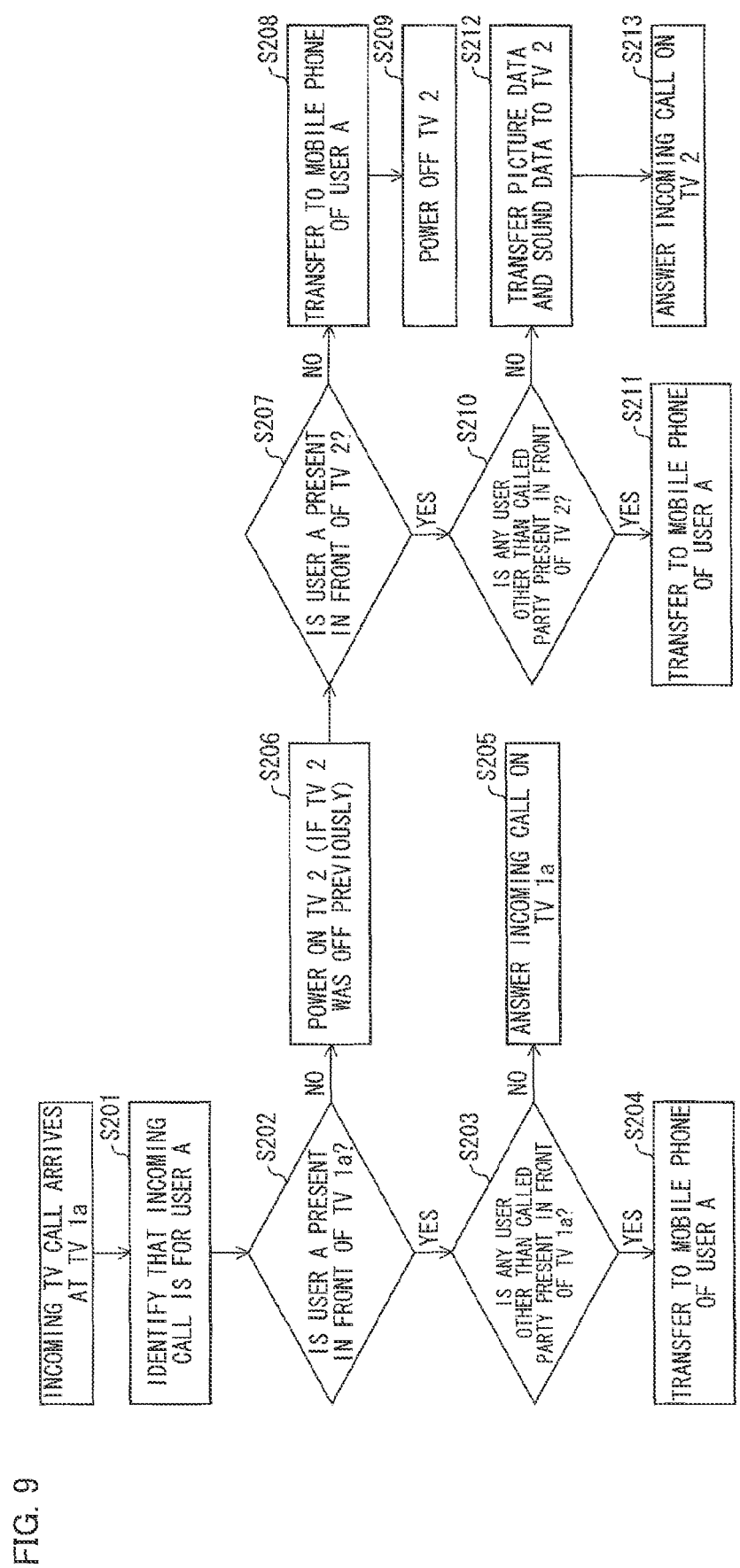
FIG. 9 is a flowchart showing a flow of a process of selecting a called device, in accordance with an embodiment of the present invention.

FIG. 9 is a flowchart showing a called device selection process carried out by the televisions 1a and 2. Note that the process described below assumes to be carried out, for example, under a circumstance as illustrated in FIG. 8, i.e., under a circumstance where, in a situation where a user 13 is watching the television 1a while a user A is watching the television 2 in a room different from where the television 1a is, an incoming call for the user A (incoming call destination) arrives over the IP communication network from a user X (a source of the incoming call) who is in a house different from where the user A is. The television 1a is connected to the IP communication network via a WiFi router 3, which is provided in the house where the users A and B are. The television 1a and the television 2 are connected to each other over the wireless LAN (WiFi) so that they can be communicated with each other.

A call signal from the user X is received by the communicating section 16 (WiFi communicating section 16 in FIG. 8) of the television 1 by way of the WiFi router 3. The call signal thus received is transmitted to the incoming call destination identifying section 11. The incoming call destination identifying section 11 identifies, from the call signal, which user is a destination of an incoming call corresponding to the call signal (step S201). The incoming call destination identifying section 11 (i) creates incoming call destination information indicating that the incoming call is for the user A and (ii) offers, to the judging section 12, the incoming call destination information thus created.

Upon receipt of the incoming call destination information, from the incoming call destination identifying section 11, indicating that the incoming call is for the user A, the judging section 12 (i) detects persons from a picture image received from the image pickup element 31 and then (ii) refers to the user identification table stored in the storing section 15 to judge the presence or absence of the user A in the person(s) contained in a detection range 5, which is obtained by the image pickup element 31 (step S202). A specific process of the judgment made by the judging section 12 is similar to that carried out in the television 1 of Embodiment 1. In a case where the judging section 12 has judged that the user A is present in the persons thus detected (YES in step S202), the judging section 12 further judges whether or not a person other than the user A is present (step S203). In a case where the judging section 12 (i) has judged that the user A is present and that a person other than the user A is present (YES in step S203), the judging section 12 notifies the communication control section 13 of such a judgment result.

Upon receipt of the notification from the judging section 12, the communication control section 13 (i) receives the incoming call destination information from the incoming call destination identifying section 11, (ii) refers to the user identification table to obtain the MAC address of the mobile phone 4 owned by the user A, and (iii) establishes a connection to the mobile phone 4. Then, the communication control section 13 causes the communicating section 16 to transfer the call signal to the mobile phone 4 owned by the user A (step S204).

On the other hand, in a case where the judging section 12 has judged that the user A is present but a person other than the user A is not present in the person(s) thus detected (NO in step S203), the judging section 12 notifies the call processing section 14 of such a judgment result. Upon receipt of the notification from the judging section 12, the call processing section 14 accepts the call signal, on the television 1a side, to start a call using the television 1a (step S210).

In step S202, in a case where the judging section 12 has judged that the user A is not present in the persons thus detected (NO in step S202), the judging section 12 notifies the judgment requesting section 19 of such a judgment result. Upon receipt of the notification from the judging section 12, the judgment requesting section 19 (i) obtains, from the incoming call destination identifying section 11, the incoming call destination information by which a user who is designated as an incoming call destination is identified and then (ii) causes the communicating section 16 to transmit the incoming call destination information to the television 2 (step S206). Here, in a case where the television 2 is being powered off, the judgment requesting section 19 also transmits, to the television 2, a signal for powering on the television 2 (step S206).

Upon receipt of the incoming call destination information from the television 1a, the communicating section 46 of the television 2 offers the incoming call destination information to the judging section 42. Upon receipt of the incoming call destination information, the judging section 42 (i) detects a person(s) from the picture image transmitted from the image pickup element 51, and then (ii) refers to the user identification table stored in the storing section 45 to judge whether or not the user A is present in the person(s) contained in a detection range 5', which is obtained by the image pickup element 51 (step S207). A specific process of the judgment made by the judging section 42 is similar to that in the television 1 of Embodiment 1. In a case where the judging section 42 judges that the user A is not present in the person(s) thus detected (NO in step S212), the judging section 42 causes the communicating section 46 to transmit such a judgment result to the television 1a. Upon receipt of a response, from the television 2, indicating the judgment result that the user A has not been detected, the judgment requesting section 19 notifies the communication control section 13 of the judgment result. Upon receipt of the judgment result from the judgment requesting section 19, the communication control section 13 refers to the user identification table to obtain the MAC address of the mobile phone 4 owned by the user A in accordance with the incoming call destination information, and then establishes a network connection to the mobile phone 4. Then, the communication control section 13 causes the communicating section 16 to transfer the call signal to the mobile phone 4 owned by the user A (step S 208). In a case where the television 2 had been powered off before the step S206, the television 1a transmits, to the television 2, a signal for powering off the television 2 (step S209).

On the other hand, in a case where the judging section 42 of the television 2 judges that the user A is present in the persons thus detected (YES in step S207), the judging section 42 of the television 2 further judges the presence or absence of a person other than the user A in the detection range 5' obtained by the image pickup element 51 (step S210). In a case where the judging section 42 has judged that a person other than the user A is present (YES in step S210), the judging section 42 causes the communicating section 46 to transmit the judgment result to the television 1a. Upon receipt of the response, from the television 2, indicating the judgment result that not only the user A but also the person other than the user A have been detected, the judgment requesting section 19 notifies the communication control section 13 of such a judgment result. Upon receipt of the above judgment result from the judgment requesting section 19, the communication control section 13 (i) refers to the user identification table to obtain the MAC address of the mobile phone 4 owned by the user A in accordance with the incoming call destination information and (ii) establishes a network connection to the mobile phone 4 owned by the user A. Then, the communication control section 13 causes the communicating section 16 to transfer the call signal to the mobile phone 4 owned by the user A (step S211).

On the other hand, in a case where the judging section 42 of the television 2 judges that the user A is present but anyone other than the user A is not present in the persons thus detected (NO in step S210), the judging section 42 causes the communicating section 46 to transmit the judgment result to the television 1a. Upon receipt of the judgment result, from the television 2, that the user A has been detected but other person has not been detected, the judgment requesting section 19 notifies the communication control section 13 of such a judgment result. Upon receipt of the above judgment result from the judgment requesting section 19, the communication control section 13 causes the communicating section 16 to transfer the call signal to the television 2 (step S212). After the television 2 has received the call signal (step S213), the communication control section 13 causes the communicating section 16 to transmit and receive the call signal containing picture data and sound data.

Note that the arrangement employed in the case where a call is to be carried out on the television 2 is not limited to the arrangement in which the call signal having been received by the television 1a is transferred to the television 2 so that the call is implemented on the television 2. As an alternative arrangement, for example, an arrangement can be employed in which, once the television 2 receives a call signal, the television 2 transmit IP information of the television 2 to a source of the incoming call in order to request the source of the incoming call to switch a connection destination of the call from the television 1a to the television 2.

With the aforementioned processes executed under the circumstance where a television call arrives at a television in a house where a plurality of televisions are installed, it is possible to start the television call not only in a situation where a user is present around a specific television (the television 1a here) but also in a situation where the user is present around any one of the televisions (the television 2 here). Also in this case, if other user is present together with the user A around the television, a call signal is transferred to the mobile phone 4 of the user A. This makes it possible to prevent a television call from been started in the presence of other user and to ensure the privacy of the call.

According to the description above, it is assumed that there are provided two televisions (1a and 2). However, Embodiment 2 is not limited to this. There can be provided three or more televisions connected to one another over a wireless LAN.

Embodiment 3

Figure 10:
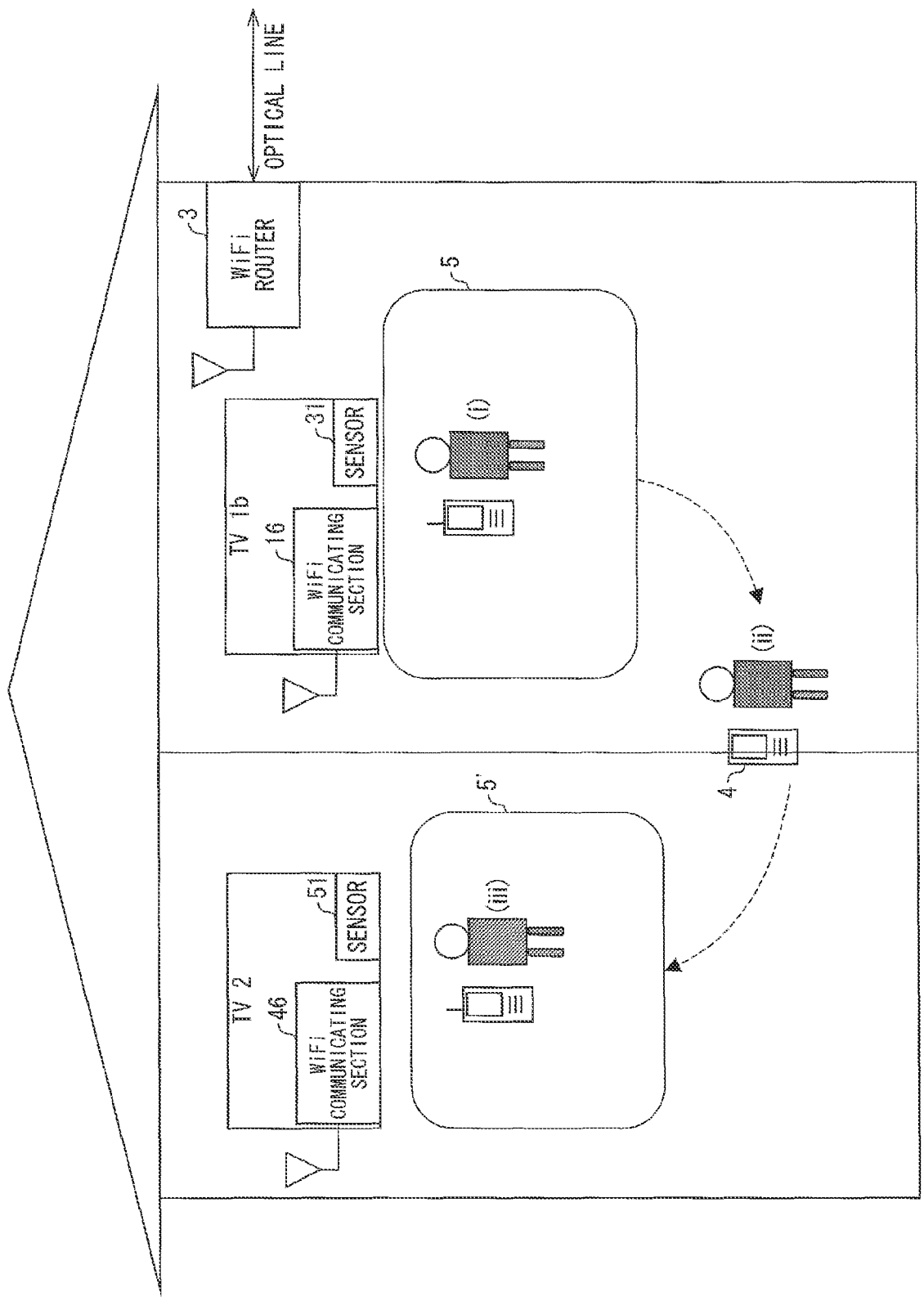
FIG. 10 is a view schematically illustrating a situation in which the present invention is assumed to be carried out in an embodiment of the present invention.

Embodiment 3 of the present invention will be described below with reference to FIGS. 10 and 11. Note that, for convenience, members that have functions identical to those described in the aforementioned embodiments are given identical reference numerals, and are not described repeatedly.

According to Embodiment 3, it is assumed (i) that there are provided in a house a plurality of televisions (television 1b and television 2) having a telephone call function for carrying out a video call over the IP communication network (see, for example, FIG. 10), and (ii) that a user A who is designated as an incoming call destination moves around in the house (e.g., moves back and forth between (i) an area around the television 1b, (ii) an area around the television 2, and (iii) an area other than the areas around the television 1b and the television 2).

The respective internal configurations and functions of the televisions 1b and 2 of Embodiment 3 are similar to those of the televisions 1a and 2 of Embodiment 2.

(Flow of Called Device Selection)

Figure 11:
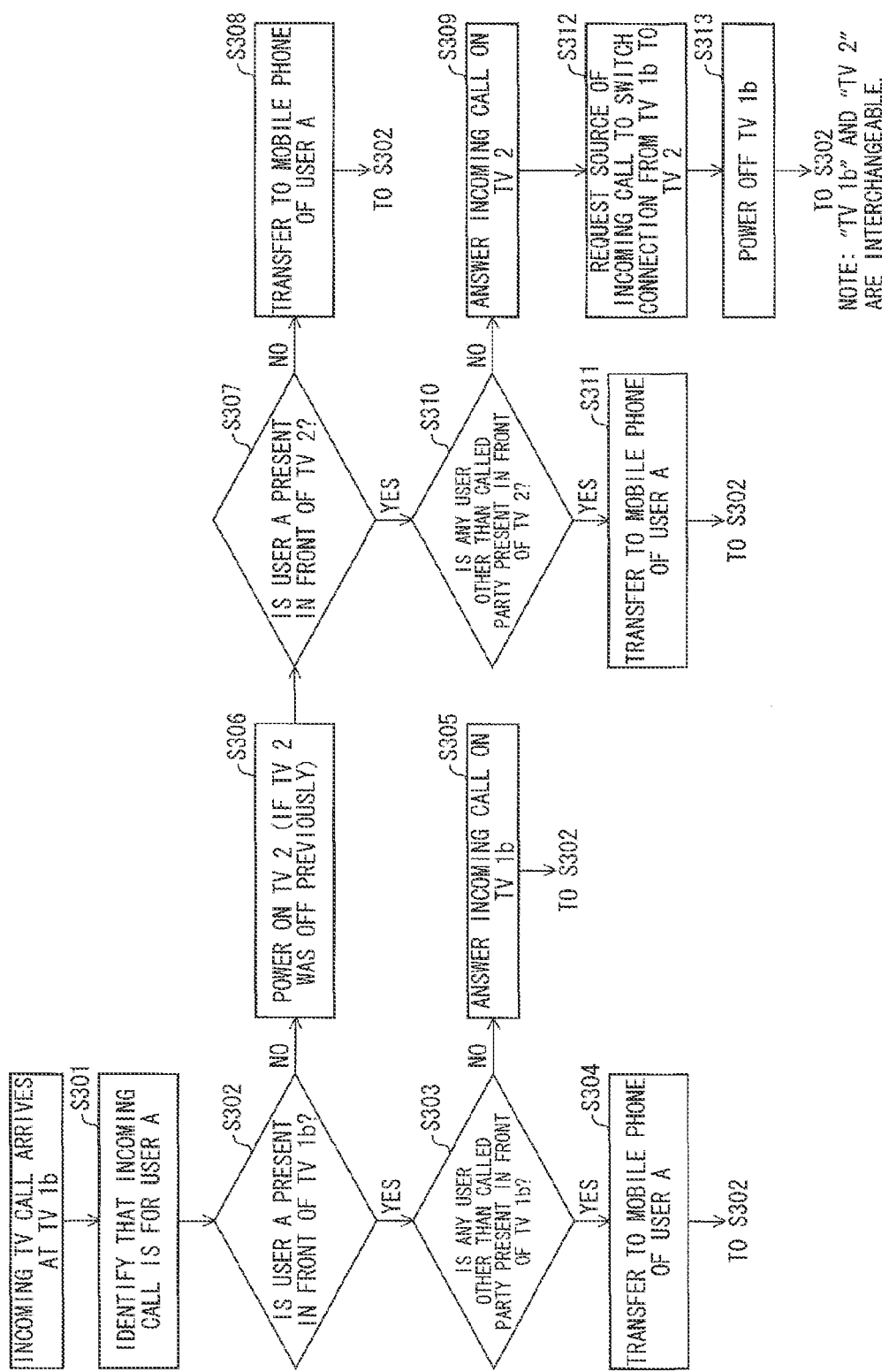
FIG. 11 is a flowchart showing a flow of a process of selecting a called device, in accordance with an embodiment of the present invention.

FIG. 11 is a flowchart showing a flow of a process of called device selection carried out through the televisions 1b and 2.

A procedure (steps S301 through S303 and S305) carried out until a call is started on the television 1b in a situation where only the user A is present around the television 1b, a procedure (steps S301, S302, S306, S307, S309, and S311) carried out until the call is started on the television 2 in a situation where only the user A is present around the television 2, and a procedure (steps S301 through S304 and S306 through S3010) carried out until a call signal is transferred to the mobile phone 4 owned by the user A in a situation (a) where the user A is not present around the television 1b or the television 2 or in a situation (b) where the user A is present, together with a person other than the user A, around any one of the televisions 1b and 2, are the same as their corresponding procedures carried out by the televisions 1a and 2 of Embodiment 2.

According to Embodiment 3, in a case where the call signal is transferred to the mobile phone 4 owned by the user A, the judging section 12 of the television 1b, even after the transfer of the call signal to the mobile phone 4 (after the step S302, S308, or S310), (i) detects a person(s) from a picture image transmitted from the image pickup element 31 and (ii) refers to the user identification table stored in the storing section 15 to judge whether or not the user A is present in the person(s) thus detected. Subsequently, the aforementioned processes appropriate to a result of the judgment made by the judging section 12 are carried out in the respective sections of the television 1b. Similarly, the judging section 42 of the television 2, even after the transfer of the call signal to the mobile phone 4, (i) detects a person(s) from a picture image transmitted from the image pickup element 51 and (ii) refers to the user identification table stored in the storing section 45 to judge whether or not the user A is present in the person(s) thus detected. Then, the aforementioned processes appropriate to a result of the judgment made by the judging section 42 are subsequently carried out in the respective sections of the television 2.

Similarly, in a case where the user A is present alone around the television 1b and the call is started by the television 1b, the judging section 12 of the television 1b, even after the receipt of the incoming call by the television 1b (after the step S305), (i) detects a person(s) from a picture image transmitted from the image pickup element 31 and (ii) refers to the user identification table stored in the storing section 15 to judge whether or not the user A is present in the person(s) thus detected. Subsequently, the aforementioned processes appropriate to a result of the judgment made by the judging section 12 are carried out in the respective sections of the television 1b. The judging section 12 continues to detect the user A until the call for the user A ends. In cases where (a) the user A carries out the call on the television 2 or the mobile phone 4 and (b) the television 2 or the mobile phone 4 directly transmits/receives the call signal to/from a source of the incoming call by bypassing the television 1b, the television or the mobile phone 4 should transmit, after the completion of the call, a signal indicating that the call has been ended to the television 1b. Similarly, the judging section 42 of the television 2, even after the receipt of the incoming call by the television 1b, (i) detects a person(s) from the picture image transmitted from the image pickup element 51 and (ii) refers to the user identification table stored in the storing section 45 to judge whether or not the user A is present in the person(s) thus detected. Subsequently, the aforementioned processes appropriate to a result of the judgment made by the judging section 42 are carried out in the respective sections of the television 2. The judging section 42 continues to detect the user A until the call for the user A ends. In a case where (i) the user A carries out on the television 1b or the mobile phone 4, the television 1b or the mobile phone 4 need to transmit, after the completion of the call, a signal indicating that the call has been ended to the television 2.

Similarly, in a case where the user A is present alone around the television 2 and the call is started on the television 2, the judging section 42 of the television 2, even after the receipt of the incoming call by the television 2 (after the step S311), (i) detects a person(s) from a picture image transmitted from the image pickup element 51 and (ii) refers to the user identification table stored in the storing section 45 to judge whether or not the user A is present in the person(s) thus detected. Subsequently, the aforementioned processes appropriate to a result of the judgment made by the judging section 42 are carried out in the respective sections of the television 2. Similarly, the judging section 12 of the television 1b, even after the receipt of the incoming call by the television 2, (i) detects a person(s) from a picture image transmitted from the image pickup element 31 and (ii) refers to the user identification table stored in the storing section 15 to judge whether or not the user A is present in the person(s) thus detected. Subsequently, the aforementioned processes appropriate to a result of the judgment made by the judging section 12 are carried out in the respective sections of the television 1b. That is, in a case where the judging section 12 has eventually detected only the user A in a state where the call signal is transferred to the mobile 4 or the television 2, the judging section 12 controls the communication control section 13 to stop the transfer of the call signal to the mobile 4 or the television 2, and the judging section 12 controls the call processing section 14 to start the call on the television 1b.

With the aforementioned procedure executed under a circumstance where the user A who is carrying out the call on the mobile phone 4 moves to the area around the television 1b or the television 2 so that the user A is present alone in such an area, the call on the mobile phone 4 is switched to the call on the television 1b or the television 2 so that the call can be started on the television 1b or the television 2.

Further, in a case where the user A moves away from the surrounding of the television 1b while his/her call is in progress on the television 1b, the call on the television 1b is switched to a call on the mobile phone 4 of the user A, so that the call can be resumed on the mobile phone 4. Furthermore, when the user A moves to the surrounding of the television 2 and becomes alone in the surrounding of the television 2, the call on the mobile phone 4 is switched to the call on the television 2, so that the call can be resumed on the television 2.

Similarly, in a case where the user A moves away from the surrounding of the television 2 while his/her call is in progress on the television 2, the call on the television 2 is switched to a call on the mobile phone 4 of the user A, so that the call can be started on the mobile phone 4. Furthermore, in a case where the user A moves to the surrounding of the television 1b and becomes alone in the surrounding of the television 1b, the call on the mobile phone 4 is switched to the call on the television 1b, so that the call can be resumed on the television 1b.

This allows the user to maintain the call even while the user move.

Note that the present embodiment may be arranged such that the user can configure as to whether or not the call in progress will be transferred to the mobile phone of the user A in a case where another user appears in the detection range 5 or 5' while the user A is in the middle of the call on the television 1b or the television 2. According to such an arrangement, in the case where another user appears in the detection range 5 or 5' while the user A is in the middle of the call on the television 1b or the television 2, the call does not necessarily have to be transferred to the mobile phone of the user A. Instead, the call can be continued on the television 1b or the television 2. For example, the television 1b may be user-configured such that, in a case where the user A is being detected by the judging section 12 (YES in step S302) during the call carried out by the user A on the television 1b, the call on the television 1b is continued without detection of a person other than the user A (step S305).

Embodiment 4

Another embodiment of the present invention will be described below with reference to FIGS. 12 through 15. Note that, for convenience, members that have functions identical to those described in the aforementioned embodiments are given identical reference numerals, and are not described repeatedly.

In the aforementioned embodiment, depending upon to the existence or nonexistence of a particular user and the existence or nonexistence of a person other than the particular user, the judgment is made as to whether or not a call signal is to be transferred to any one of the mobile phone 4 and the television 2, which is another television, capable of carrying out a call using IP. In Embodiment 4, the judgment as to whether or not a call signal is to be transferred to any one of the mobile phone 4 and the television 2 is made with consideration further given to a category of a content which the user is viewing.

(Main Configuration of Television 1c)

Figure 12:
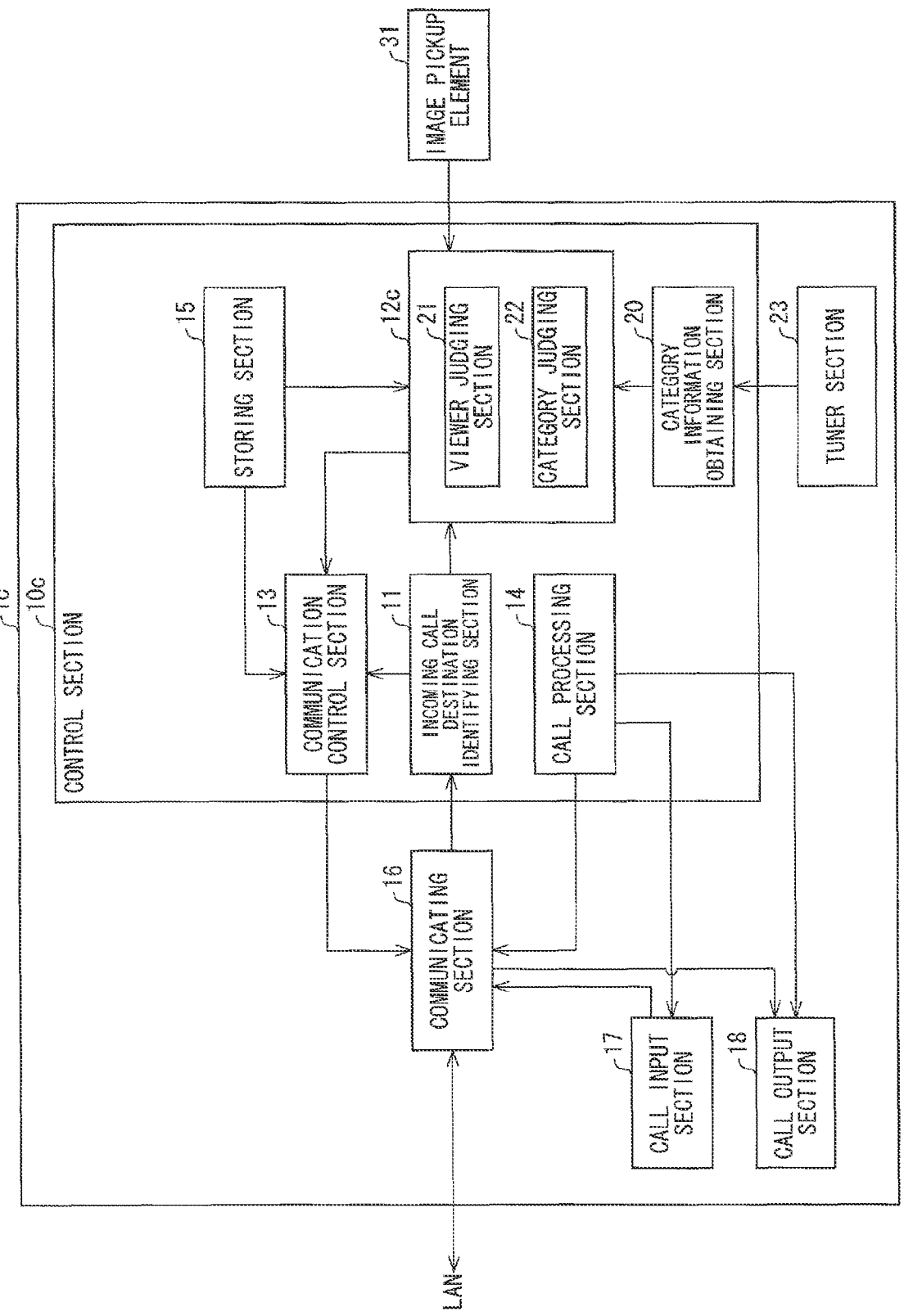
FIG. 12 is a block diagram illustrating a main configuration of a playback device in accordance with an embodiment of the present invention.

A main configuration of a television of Embodiment 4 will be described with reference to FIG. 12. FIG. 12 is a block diagram illustrating a main configuration of the television 1c of Embodiment 4.

The television 1c is different from the television 1 in the points that a control section 10c includes a category information obtaining section 20 and that a judging section 12c includes both a viewer judging section 21 and a category judging section 22 (see FIG. 12).

The category information obtaining section 20 obtains category information indicative of a category of a content which the user is viewing on the television 1c. The term "category of a content" used herein refers to, for example, movies, news, dramas, sports, music, etc. The category information of a viewing content can be obtained, for example, by extracting category information corresponding to a broadcast program content that the user is currently viewing, from EPG information received by, for example, a tuner section 23 such as a digital tuner section or an IP broadcast tuner section.

The category judging section 22 refers to a transfer setting table to obtain category information of a viewing content, and then judges, in accordance with the category information thus obtained, the necessity or unnecessity of transfer of a call signal and the necessity or unnecessity of detection of the user. FIG. 13 illustrates an example transfer setting table. The transfer setting table is a table in which the category information is associated with (i) a setting ("TRANSFER TO MOBILE PHONE" or "RECEPTION ON TV") as to which of transfer to the mobile phone 4 and reception on the television 1c is to be performed with a higher priority and (ii) a setting on whether or not a user who is designated as an incoming call destination is to be detected ("VALID" or "INVALID") (see FIG. 13).

(Flow of Called Device Selection)

Next, a process to be carried out by the television 1c configured as described above will be described below with reference to FIGS. 13 and 14. The process described below assumes to be carried out under a circumstance where an incoming call for the user A has arrived.

Figure 14:
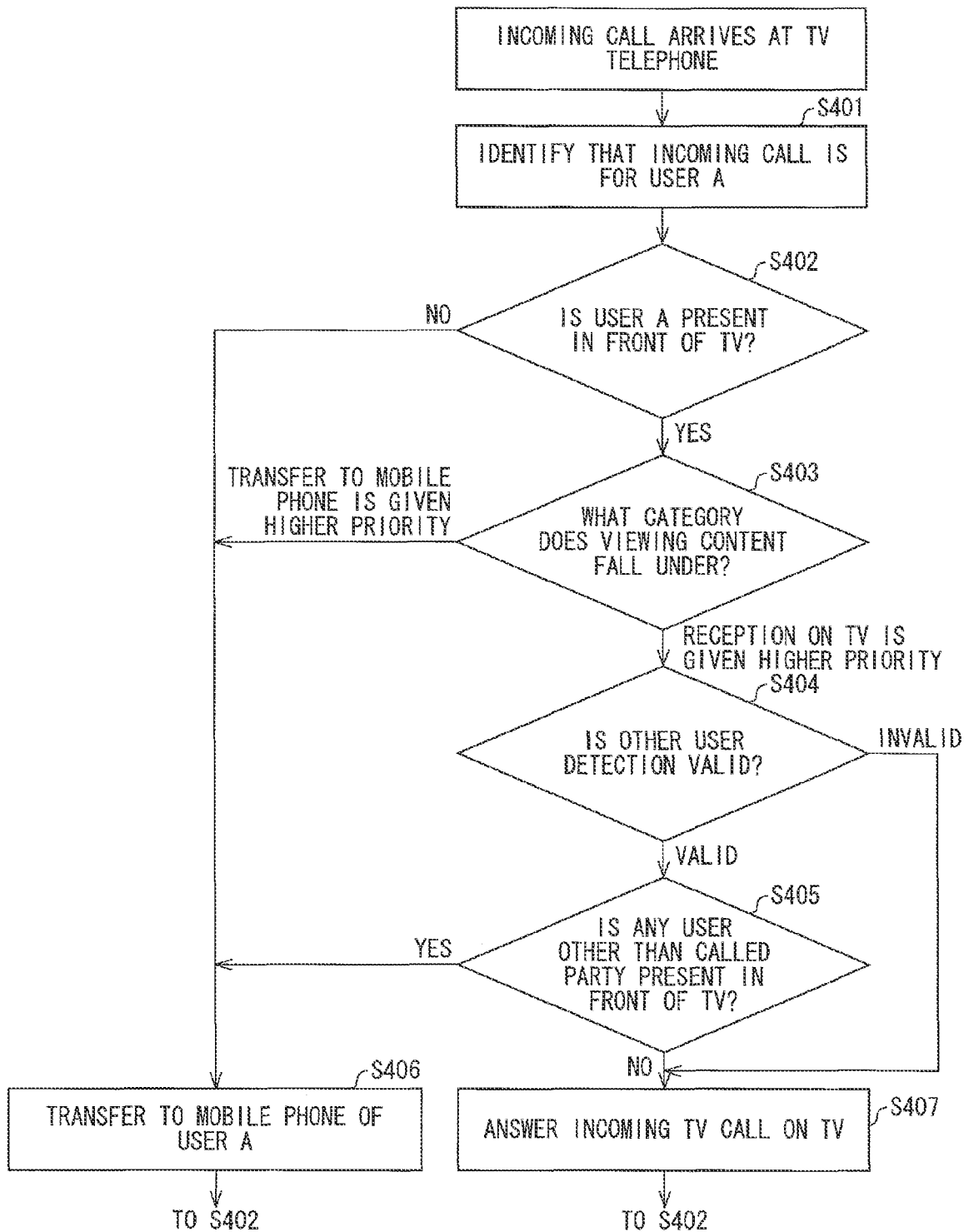
FIG. 14 is a flowchart showing a flow of a process of selecting a called device, in accordance with an embodiment of the present invention.

FIG. 14 is a flowchart showing a called device selection process carried out by the television 1c.

Upon receipt of a call signal, the communicating section 16 of the television 1c forwards the call signal to the incoming call destination identifying section 11. The incoming call destination identifying section 11 identifies, from the call signal, which user is a destination of an incoming call corresponding to the call signal (step S401). The incoming call destination identifying section 11 transmits, to the viewer judging section 21, incoming call destination information indicating that the incoming call is for the user A. Upon receipt of the incoming call destination information from the incoming call destination identifying section 11, the viewer judging section 21 (i) detects a person(s) from a picture image received from the image pickup element 31 and then (ii) refers to the user identification table stored in the storing section 15 to judge the presence or absence of the user A in the person(s) thus detected (step S402). A specific process of the judgment is similar to that carried out in the television 1 of the aforementioned embodiment. In a case where the viewer judging section 21 has judged that the user A is not present in the person(s) thus detected (NO in step S402), the viewer judging section 21 notifies the communication control section 13 of such a judgment result. Upon receipt of the notification from the viewer judging section 21, the communication control section 13 (i) receives the incoming call destination information from the incoming call destination identifying section 11, (ii) refers to the user identification table to obtain the MAC address of the mobile phone 4 owned by the user A, and (iii) establishes a connection to the mobile phone 4. Then, the communication control section 13 causes the communicating section 16 to transfer, the call signal to the mobile phone 4 owned by the user A (step S406). On the other hand, in a case where the viewer judging section 21 has judged that the user A is present in the person(s) thus detected (YES in step S402), the viewer judging section 21 notifies the category judging section 22 of such a judgment result. The category judging section 22 refers to (a) category information of a currently selected viewing content, which has been obtained by the category information obtaining section 20, and (b) the transfer setting table stored in the storing section 15, to execute a processing corresponding to a category of the currently selected viewing content (step S403). Specifically, in a case where a setting that will carry out, with a higher priority, a process for transferring the call signal to the mobile phone 4 of the user ("TRANSFER TO MOBILE PHONE") has been specified for the category of the viewing content (for example, the category of the viewing content is "MOVIES" and "MUSIC" in the transfer setting table illustrated in FIG. 13), the communication control section 13 is controlled to carry out the process for transferring the call signal. Upon receipt of a control command from the category judging section 22, the communication control section 13 carries out the process for transferring the call signal to the mobile phone 4 owned by the user A (step S406). On the other hand, in a case where a setting that will carry out, with a higher priority, a process for the reception on the television 1c ("RECEPTION ON TV") has been specified for the category of the viewing content (for example, the category of the viewing content is "NEWS" and "SPORTS" in the table illustrated in FIG. 13), the category judging section 22 further refers to the transfer setting table to determine whether to carry out a process for detecting the presence or absence of a person other than the user A. More specifically, in a case where the setting as to whether to detect the presence or absence of a person other than the user A is "VALID" for the category of the viewing content, (for example, the category of the viewing content is "NEWS" in the table illustrated in FIG. 13), the category judging section 22 controls the viewer judging section 21 to judge the presence or absence of a person other than the user A in accordance with image data received from the image pickup element 31 (step S405). In a case where the viewer judging section 21 has judged that a person other than the user A is present (YES in step S405), the viewer judging section 21 controls the communication control section 13 to carry out the process for transferring the call signal. Upon receipt of the control command from the viewer judging section 21, the communication control section 13 carries out the process for transferring the call signal to the mobile phone 4 owned by the user A (step S406). On the other hand, in a case where the viewer judging section 21 has judged that a person other than the user A is not present (NO in step S405), the viewer judging section 21 controls the call processing section 14 to carry out a call process. Upon receipt of the control command from the viewer judging section 21, the call processing section 14 receives the call signal from the communicating section 16 and then starts the call on the television 1c (step S407). Further, in a case where the setting as to whether to detect the presence or absence of a person other than the user A is "INVALID" for the category of the viewing content, (for example, the category of the viewing content is "SPORTS" in the table illustrated in FIG. 13), the category judging section 22 controls the call processing section 14 to carry out the call process. Upon receipt of the control command from the category judging section 22, the call processing section 14 receives the call signal from the communicating section 16 and then starts the call on the television 1c (step S407).

Note that even after the user A has started the call on any of the devices, the category judging section 22 subsequently obtains a category of a currently selected viewing content from the category information obtaining section 20 to judge the category of the currently selected viewing content. In a case where the category of the viewing content has been changed, the process in step S402 and the subsequent process are carried out again to judge as to whether or not the transfer is to be carried out.

Figure 15:
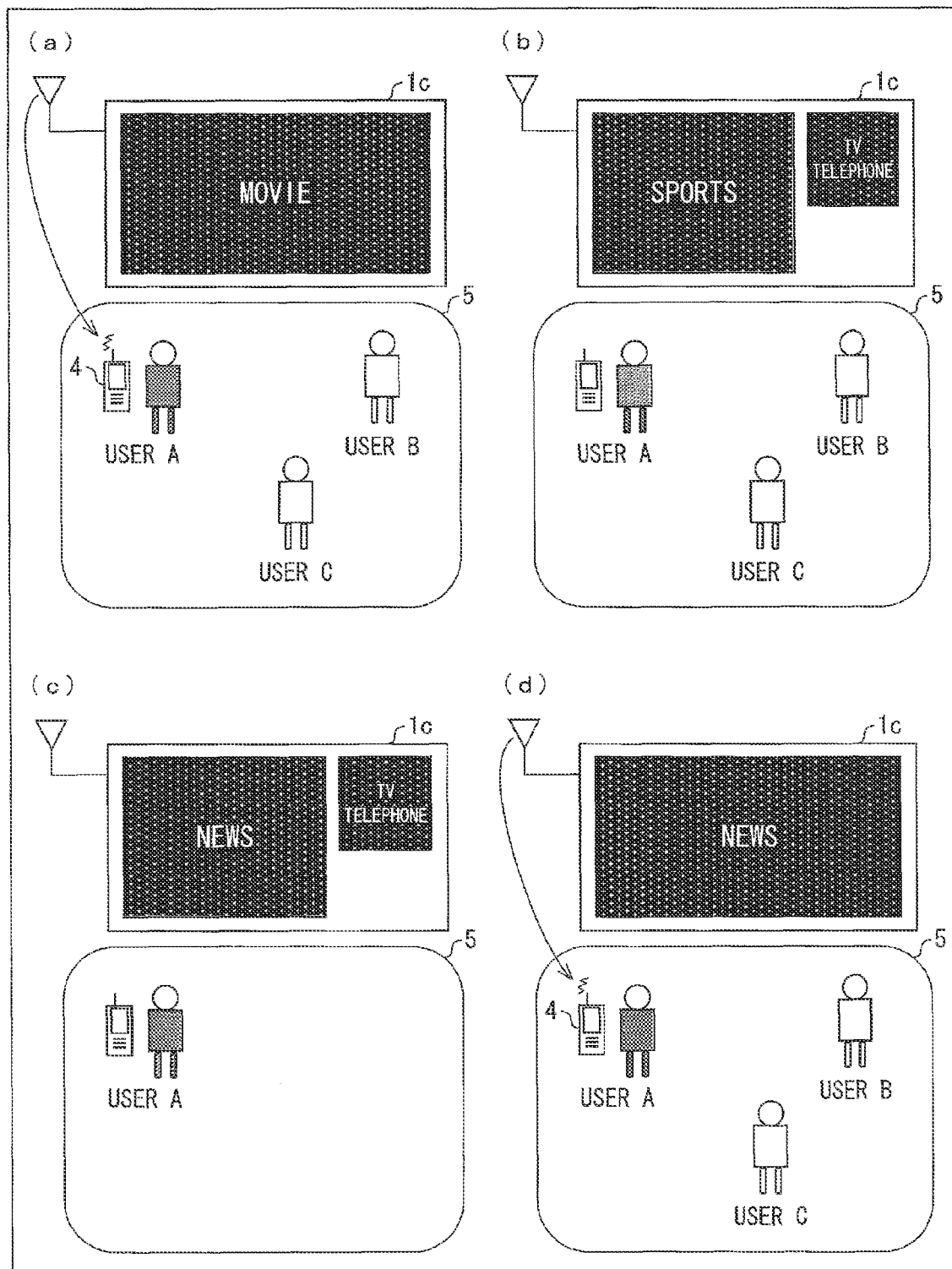
FIG. 15 is a view schematically illustrating a situation in which the present invention is assumed to be carried out in an embodiment of the present invention.

With the aforementioned processes executed, an incoming call arriving for the user A while the user A is in the middle of watching a movie is transferred to the mobile phone 4 of the user A regardless of the presence or absence of other viewer ((a) of FIG. 15). Further, for example, assume that an incoming call arrives for the user A while the user A is in the middle of watching sports. In this case, the incoming call is received on the television 1c regardless of the presence or absence of other viewer, so that the call is started on the television 1c ((b) of FIG. 15). Note that in a case where the user A (and other viewer) is watching a television broadcast at the arrival of the incoming call, both an image involved in the television broadcast and a picture image involved in the call need to be displayed so as to prevent viewing of a television broadcast from being interrupted. Further, for example, in a case where the user A is viewing news in a situation where other viewer is not present in the detection range 5 obtained by the image pickup element 31, an incoming call arriving for the user A is received on the television 1c, so that the call is started on the television 1c ((c) of FIG. 15). On the other hand, in a case where the user A is watching news in a situation where other viewer is present in the detection range 5 obtained by the image pickup element 31, an incoming call arriving for the user A is transferred to the mobile phone 4 of the user A ((d) of FIG. 15).

[Program and Storage Medium]

Finally, the blocks contained in the televisions 1, 1a to 1c, and 2 may be constituted by hardware logic. Alternatively, they may be realized by software by means of a CPU (Central Processing Unit) as described below.

That is, the televisions 1, 1a to 1c, and 2 each include: a CPU that executes instructions of a control program realizing the foregoing functions; and a storage device ("storage medium") such as ROM (Read Only Memory) that stores the control program therein, RAM (Random Access Memory) that develops the control program in executable form, and memory that stores the control program and various kinds of data therein.

With this arrangement, the object of the present invention can be achieved by a predetermined storage, medium. The storage medium needs only to store, in computer-readable manner, program codes (executable program, intermediate code program, and source program) of the control program, which is software for realizing the aforesaid functions, of the televisions 1, 1a to 1c, and 2. The storage medium is provided to the television 1. With this arrangement, the televisions 1, 1a to 1c, and 2 (alternatively, CPU or MPU) as a computer reads out and executes program code stored in the storage medium provided.

The storage medium making the program code available to the televisions 1, 1a to 1c, and 2 is not limited to a storage medium of a particular structure or of a particular type. That is, the storage medium may be tape based, such as a magnetic tape or cassette tape; disc based, such as a magnetic disk including a Floppy® disc and hard disk and optical disk including CD-ROM, MO, MD, DVD, and CD-R; card based, such as an IC card (including a memory card) and an optical card; or a semiconductor memory, such as a mask ROM, EPROM, EEPROM®, and a flash ROM.

Further, the above program code can be made available to the televisions 1, 1a to 1c, and 2 through a communication network. The communication network is not particularly limited to a communication network of a particular type or of a particular form as long as it enables the program code to be made available to the televisions 1, 1*a* to 1*c*, and 2. Examples of the communication network include the Internet, intranet, extranet, LAN, ISDN, VAN, CATV communication network, virtual private network, telephone network, mobile communication network, and satellite communication network.

Further, a transmission medium that constitutes the communication network needs only to be any medium capable of transmitting program code and is not particularly limited to a transmission medium of a particular structure or of a particular type. Examples of the transmission medium include (i) wired lines such as IEEE 1394, USB (Universal Serial Bus), power-line carrier, cable TV lines, telephone lines, and ADSL (Asymmetric Digital Subscriber Line) lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

As described above, in order to solve the above problem, a playback device of the present invention is a playback device (i) including a function of carrying out a call using Internet Protocol (IP) and (ii) being capable of playing back one of a picture image and a sound, the playback device including: communicating means for transmitting and receiving a call signal over an IP communication network; incoming call destination identifying means for identifying a user who is designated as an incoming call destination of the call; person detecting means for detecting a person who is present around the playback device; and transferring means for, in a case where the person detecting means has detected a plurality of persons containing the user, transferring the call signal having been received by the communicating means to another device which is available for the user to carry out the call.

The playback device according to the present invention is preferably configured such that the user and a user-specific feature amount are recorded, so as to be associated with each other, in a storing section accessible from the playback device, the playback device further includes extracting means for extracting a feature amount of a person(s) having been detected by the person detecting means, and the transferring means is configured to transfer the call signal having been received by the communicating means to the another device, if the following conditions are met: (a) that the person detecting means has detected a plurality of persons; and (b) that a feature amount of any one of the persons, which feature amount has been extracted by the extracting means, matches the user-specific feature amount.

According to the above configuration, it is possible to carry out a user detection based on user-specific feature amounts which are recorded in the storing section.

The playback device according to the present invention is preferably such that address information on a mobile terminal owned by the user is further recorded in the storing section so as to be associated with the user and the user-specific feature amount, and the transferring means refers to the address information to transfer the call signal having been received by the communicating means to the mobile terminal owned by the user.

According to the above configuration, it is possible to directly inform, of the arrival of an incoming call, a user who is designated as an incoming call destination. As such, in a case where a plurality of persons are viewing a content on the playback device, it is possible to inform the user who is designated as the incoming call designation of the arrival of the incoming call, without disturbing the content viewing, and it is possible for the user to carry out a call with his/her own mobile terminal.

The playback device according to the present invention is preferably configured such that the playback device further includes: inquiring means for requesting another playback device, which is communicably connected to said playback device, to make a response as to whether or not the user is present around the another playback device, the transferring means being configured to transfer the call signal having been received by the communicating means to any playback device which has made a response, to said playback device, that the user is present alone around that playback device.

According to the above configuration, another playback device is caused to detect whether or not a user who is designated as an incoming call destination is present around the another playback device. Then, the call signal can be transferred to any playback device which has made a response that the target user is present alone around that playback device. Hence, in a situation where there are provided a plurality of playback devices, it is possible to carry out the call on a playback device around which the user who is designated as an incoming call destination is present alone, and to ensure the privacy of the call.

The playback device according to the present invention is preferably such that, in a case where the person detecting means detects only the user during transfer of the call signal by the transferring means, the transferring means stops the transfer of the call signal.

According to the above configuration, it is possible to switch a call on a mobile terminal to a call on a playback device when the situation around the playback device has changed to a situation where the user who is designated as the incoming call destination becomes present alone around the playback device.

The playback device according to the present invention is preferably such that the picture image includes category information indicative of a category of the picture image, and in a case where the category information of a picture image being played back by said playback device indicates a predetermined category, the transferring means transfers the call signal having been received by the communicating means to the mobile terminal owned by the user.

According to the above configuration, whether or not the call signal is to be transferred is determined depending upon a category of a viewing content. Thus, in a case where a content of a specific category being viewed by the user is such that the user does not want to be interrupted while viewing the content, it is possible to prevent the user from being interrupted while viewing such a content.

A method for selecting a device to carry out a call process, according to the present invention, is a method for a playback device (i) including a function of carrying out a call using Internet Protocol (IP) and (ii) being capable of playing back one of a picture image and a sound, to select a device to carry out a call process, the method including the steps of: (a) receiving a call signal over an IP communication network; (b) identifying a user who is designated as an incoming call destination of the call; (c) detecting a person who is present around the playback device; and (d) in a case where a plurality of persons containing the user have been detected in the step (c), transferring the call signal having been received in the step (a) to another device which is available for the user to carry out the call.

The method for selecting a device to carry out a call process, according to the present invention is preferably such that, after the step (d), the steps (c) and (d) are repeatedly carried out until the call is completed.

According to the above configuration, even in a case where the user having started a call moves in the middle of the call, it is possible to transfer the call to a device appropriate to the situation where the user is currently present, and it is possible to continue the call on that device.

The present invention is not limited to the aforementioned embodiments and is susceptible of various changes within the scope of the accompanying claims. That is, embodiments obtained by suitable combinations of technical means modified within the scope of the accompanying claims are also included within the technical scope of the present invention.

INDUSTRIAL APPLICABILITY

The present invention is suitably applicable to a television receiver capable of a call using Internet Protocol.

REFERENCE SIGNS LIST 1, 1a to 1c Television (playback device)
2 Television (device, playback device)
3 WiFi router
4 Mobile phone (device, mobile terminal)
10, 10a, 10c Control section
11 Incoming call destination identifying section (incoming call destination identifying means)
12, 12c Judging section (person detecting means, extracting means)
13 Communication control section (transferring means, communicating means)
14 Call processing section (communicating means)
15 Storing section
16 Communicating section (communicating means)
17 Input section
18 Output section
19 Judgment requesting section (inquiring means)
20 Category information obtaining section
21 Viewer judging section (judging means)
22 Category judging section (judging means)
23 Tuner section
31 Image pickup element

The invention claimed is:

1. A playback device (i) including a function of carrying out a call using Internet Protocol (IP) and (ii) being capable of playing back one of a picture image and a sound, the playback device comprising:
one or more processors,
the one or more processors transmitting and receiving a call signal over an IP communication network, the call signal representing a sound of a voice during the call;
the one or more processors identifying a user who is designated as an incoming call destination of the call;
the one or more processors detecting a person who is present around the playback device; and
in a case where the one or more processors have detected a plurality of persons containing the user, the one or more processors transferring the call signal having been received by the one or more processors to another device which is associated with the user to carry out the call.

2. The playback device according to claim 1, wherein the user and a user-specific feature amount are recorded, so as to be associated with each other, in a storing section accessible from the playback device,
the one or more processors extract a feature amount of a person(s) having been detected by the one or more processors, and
the one or more processors are configured to transfer the call signal having been received by the one or more processors to the another device associated with the user, if the following conditions are met: (a) that the one or more processors have detected a plurality of persons; and (b) that a feature amount of any one of the persons, which feature amount has been extracted by the one or more processors, matches the user-specific feature amount.

3. The playback device according to claim 2, wherein address information on a mobile terminal associated with the user is further recorded in the storing section so as to be associated with the user and the user-specific feature amount, and
the one or more processors refer to the address information to transfer the call signal having been received by the one or more processors to the mobile terminal associated with the user.

4. The playback device according to claim 1, wherein:
the one or more processors request another playback device, which is communicably connected to said playback device, to make a response as to whether or not the user is present around the another playback device, and
the one or more processors are configured to transfer the call signal having been received by the one or more processors to any playback device which has made a response, to said playback device, that the user is present alone around that playback device.

5. The playback device according to claim 1, in a case where the one or more processors detect only the user during transfer of the call signal by the one or more processors, the one or more processors stop the transfer of the call signal.

6. The playback device according to claim 3, wherein the picture image includes category information indicative of a category of the picture image, and
in a case where the category information of a picture image being played back by said playback device indicates a predetermined category, the one or more processors transfer the call signal having been received by the one or more processors to the mobile terminal associated with the user.

7. A television receiver comprising the one or more processors of a playback device according to claim 1.

8. A non-transitory computer-readable storage medium storing therein a program for causing a computer to function as the one or more processors of a playback device according to claim 1.

9. A playback device (i) including a function of carrying out a call using Internet Protocol (IP) and (ii) being capable of playing back one of a picture image and a sound, the playback device comprising:
one or more processors,
the one or more processors transmitting and receiving a call signal over an IP communication network, the call signal representing a sound of a voice during the call;
the one or more processors identifying a user who is designated as an incoming call destination of the call;
the one or more processors detecting a person who is present around the playback device; and
in a case where the one or more processors have not detected the user thus identified, the one or more processors transferring the call signal having been received by the one or more processors to another device associated with the user to carry out the call.

10. A method for a playback device (i) including a function of carrying out a call using Internet Protocol (IP) and (ii) being capable of playing back one of a picture image and a sound, to select a device to carry out a call process, the method comprising the steps of:
- (a) receiving a call signal over an IP communication network, the call signal representing a sound of a voice during the call;
- (b) identifying a user who is designated as an incoming call destination of the call;
- (c) detecting a person who is present around the playback device; and
- (d) in a case where a plurality of persons containing the user have been detected in the step (c), transferring the call signal having been received in the step (a) to another device which is associated with the user to carry out the call.

11. The method according to claim 10, wherein
after the step (d), the steps (c) and (d) are repeatedly carried out until the call is completed.

12. A method for a playback device (i) including a function of carrying out a call using Internet Protocol (IP) and (ii) being capable of playing back one of a picture image and a sound, to select a device to carry out a call process, the method comprising the steps of:
- (a) transmitting and receiving a call signal over an IP communication network, the call signal representing a sound of a voice during the call;
- (b) identifying a user who is designated as an incoming call destination of the call;
- (c) detecting a person who is present around the playback device; and
- (d) in a case where the user thus identified has not been detected in the step (c), transferring the call signal having been received in the step (a) to another device which is associated with the user to carry out the call.

* * * * *